US007640181B2

(12) United States Patent
McClure et al.

(10) Patent No.: US 7,640,181 B2
(45) **Date of Patent: *Dec. 29, 2009**

(54) DISTRIBUTED NETWORK VOTING SYSTEM

(75) Inventors: Neil L. McClure, Longmont, CO (US); Victor L. Babbitt, Berthoud, CO (US); Roberts Simon Harry George, Westminster, CO (US)

(73) Assignee: Hart InterCivic, Inc., Austin, TX (US)

( * ) Notice: Subject to any disclaimer, the term of this patent is extended or adjusted under 35 U.S.C. 154(b) by 1012 days.

This patent is subject to a terminal disclaimer.

(21) Appl. No.: 10/342,909

(22) Filed: Jan. 14, 2003

(65) Prior Publication Data

US 2004/0024635 A1 Feb. 5, 2004

Related U.S. Application Data

(63) Continuation-in-part of application No. 09/882,758, filed on Jun. 15, 2001, now Pat. No. 6,873,966, and a continuation-in-part of application No. 09/505,821, filed on Feb. 17, 2000, now Pat. No. 7,152,156.

(60) Provisional application No. 60/348,567, filed on Jan. 14, 2002, provisional application No. 60/211,840, filed on Jun. 15, 2000, provisional application No. 60/255,486, filed on Dec. 13, 2000.

(51) Int. Cl.
*G06F 11/00* (2006.01)

(52) U.S. Cl. .......................................................... 705/12

(58) Field of Classification Search .................... 705/12
See application file for complete search history.

(56) References Cited

U.S. PATENT DOCUMENTS

| | | | | |
|---|---|---|---|---|
| 4,717,177 | A * | 1/1988 | Boram | 283/5 |
| 5,878,399 | A * | 3/1999 | Peralto | 705/12 |
| 6,081,793 | A * | 6/2000 | Challener et al. | 705/50 |
| 6,175,833 | B1 * | 1/2001 | West et al. | 707/102 |
| 6,233,564 | B1 * | 5/2001 | Schulze, Jr. | 705/14 |
| 6,311,190 | B1 * | 10/2001 | Bayer et al. | 707/104.1 |
| 6,892,944 | B2 * | 5/2005 | Chung et al. | 235/386 |
| 6,968,999 | B2 * | 11/2005 | Reardon | 235/386 |
| 2002/0134844 | A1 * | 9/2002 | Morales | 235/492 |
| 2002/0138341 | A1 * | 9/2002 | Rodriguez et al. | 705/12 |

OTHER PUBLICATIONS

Adler, Jim. "Internet Voting Security". Jan. 2000. VoteHere.net.*

Cranor, Lorrie Faith. "Electronic Voting: Computerized Polls May Save Money, Protect Privacy". 1996. retrieved from <http://www.acm.orgm/crossroads/xrds2-4/voting.html>.*

Jones, Bill. "California Internet Voting Task Force—A Report on the Feasibility of Internet Voting". Jan. 2000. retrieved from <http://www.sos.ca.gov/executive/ivote/final_report.pdf>.*

Ludlow, Randy. "Voting by mail possible Plan eases absentee rules". Oct. 21, 1999. Post Ohio Bureau. p. 12A.*

Oulton, Stacie. "Jeffco to invite mail-in voting". Jan. 8, 2000. Denver Post. p. B02.*

* cited by examiner

*Primary Examiner*—Jonathan G. Sterrett
*Assistant Examiner*—Peter Choi
(74) *Attorney, Agent, or Firm*—Lathrop & Gage LLP

(57) ABSTRACT

A secure election system provides a downloadable ballot viewer object for the casting of ballots. The ballot viewer object authenticates the user, permits user interaction in the casting of ballots, seals the cast ballot image by encryption, and transmits the cast ballot to election headquarters. The ballot viewer object may be used to perform secure voting on the Internet.

17 Claims, 18 Drawing Sheets

DISTRIBUTED NETWORK VOTING SYSTEM

RELATED APPLICATIONS

This application claims benefit of priority to provisional application Ser. No. 60/348,567 filed Jan. 14, 2002, and is a continuation-in-part of application Ser. No. 09/882,758 (now U.S. Pat. No. 6,873,966) filed Jun. 15, 2001, which in turn claims benefit of priority to provisional application Ser. No. 60/211,840 filed Jun. 15, 2000, and provisional application Ser. No. 60/255,486 filed Dec. 13, 2000; and is also a continuation-in-part of application Ser. No. 09/505,821 (now U.S. Pat. No. 7,152,156) filed Feb. 17, 2000.

BACKGROUND OF THE INVENTION

1. Field of the Invention

The present invention relates to electronic voting systems and, more specifically, to networked interactive online devices and methods for facilitating elections through the use of computer network systems, such as the Internet. Examples of elections that may make use of these systems include local, state, and national elections, as well as any other voting decision, such as a corporate election of a board of directors or decisions being made by a local homeowner's association.

2. Description of the Related Art

The year 2000 Presidential election highlighted many deficiencies in voting practices of the United States. One area that displayed the need for improvement was the support for enfranchisement of overseas citizens as mandated by the Uniformed and Overseas Citizens Absentee Voting Act (UOCAVA). Many citizens within this category of voters are either in the military or with the State Department and, consequently, the Presidential designee for carrying out the Federal provisions is the Secretary of Defense. The Federal Voting Assistance Program (FVAP), under the Department of Defense (DOD), administers the Act and seeks to achieve maximum access to the polls for these citizens.

The FVAP recently conducted a pilot program, called Voting Over the Internet (VOI), in an attempt to increase access to the polls for overseas citizens. The pilot program was considered a success; however, several factors indicated that the approach used in the pilot program was not suited for widespread implementation. The June 2001 Assessment Report on the VOI project describes the architecture of the system to provide this service, and makes recommendations for further improvement. The document proposes two alternatives to the previous VOI project that will solve many of the problems identified by the FVAP and provide a much improved process for meeting the requirements of UOCAVA.

Overseas voters presently use a two-step mailing process where information is transferred between the voter and the governing jurisdiction. The governing jurisdiction is the entity conducting the election for which the voter is seeking participation. The governing jurisdiction is typically a county, but can be a State level and is hereafter referred to as the Local Election Office (LEO). The first mailing amounts to the voter requesting an absentee ballot overseas and first form is sent into the LEO sometime prior to the election and typically has a cut-off date for requests. The request for a ballot is acknowledged by the LEO by return mail. At this point, the voter is approved to receive an absentee ballot when such ballots are available.

Absentee mail-in ballots that are in use today are created using either punchcard or marksense technology, both of which require an offset printing process to produce printed ballots. This fact has a significant impact on the availability of election ballots and directly effects the voting cycle of an Overseas Voter (OSV). The contests and races for an election go through several approval and review cycles leading up to an election. The end result is that the ballot becomes "certified" with as little as 45 days prior to the election date. Once certified, the ballot may be printed and barring any problems in the printing process, will require two weeks to deliver to the printer and receive printed ballots. This leaves 30 days to mail the ballot to the voter and for the voter to return the ballot to LEO. With mailing cycles for overseas mail ranging from 10-25 days, to likelihood of the voter returning his or her ballot by the date of the election is small. This problem is a significant obstacle that often foils the objectives of the FVAP.

The 2001 Assessment Report on the VOI project produced by the FVAP identifies many concerns with the Pilot Project and future implementations. Other notable reviews of the prospect of Internet Voting have echoed many of these same concerns including Viruses and Trojan Horses, denial of Service for Internet Voting Services, integration with a Local Election Office's (LEO's) Registration Services, integration with a Local Election Office's (LEO's) Ballot Definition/Creation Systems, and integration with a Local Election Office's (LEO's) Ballot Tabulation System.

In principal, any general-purpose computer may harbor malicious viruses or Trojan horses on its hard drive or within any of its programs or operating system components that are designed to interfere with an Internet Voting System. Internet Voting using Public Key Infrastructure (PKI) encryption and digital signatures for security does not solve this problem, and the several studies of Internet Voting conclude that this problem is the most difficult barrier to large scale Internet Voting. The Virus and Trojan horse issue is generally related to the voter's computer workstation which represents the single greatest risk to any Internet voting system. The voter's workstation is a complete unknown due to a wide variety of system implementations that are in existence. Any voting solution that requires computational processing involving the host workstation's memory needs to bring a measure of control and assurance that any executed process operates as intended.

With the open nature of the Internet, any service that is based on servers connected to the Internet at large is open to attacks that will flood these servers with traffic that may effectively deny service to valid users. While this is less of a problem for services that are not time-sensitive, such as election day voting, it remains a problem that is not solved by the present FVAP VOI structure or many other proposed Internet Voting systems. Recent well-publicized attacks of large commercial Internet companies shows how even a single young hacker can implement a successful Denial of Service attack.

Local states and counties have differing laws and procedures covering voter registration. While the present VOI project allowed remote voter registration, the process was not well integrated into the counties practices and systems, and this lack of integration will be a problem for any large-scale implementation of overseas voting through the FVAP.

The ballot for a particular election in a jurisdiction may include literally hundreds of different ballot styles, and the different ballot styles must be exactly aligned to the districts and precinct assignments that create the differing ballot styles. In addition, different jurisdictions may have specific laws or practices that concern the presentation of the ballot, so a single ballot format will not be applicable to all jurisdictions. Therefore, the integration of the LEO's ballot definition system with the FVAP VOI system is paramount to reducing the potential errors in presenting the ballots correctly.

In general, the actual tabulation or tallying of votes for absentee voting of any kind must be done at the LEO at a time and in the manner the LEO requires. While certain types of pre-processing of returned ballot data may be done more freely, the actual tabulation is governed by very rigid laws, which are meant to reduce the possibility of fraud or error in tabulation. Therefore, any internet voting system needs to include the ability to do the actual tabulation of individual ballots at the LEO, and the output of this tabulation needs to be properly integrated into the LEOs tabulation system.

To improve the present UOCAVA process performance, the primary parameter of the process that needs improvement is speed. The whole process needs to speed up to shorten the cycle time. This will increase the likelihood that an OSV will be able to return his or her ballot within the allowed time period, in order to avoid is the number one factor for disenfranchising overseas voters. Areas for improvement are first, the transport of information between the LEOs and the voters, and secondly, the amount of time required at the LEOs for information processing between transport cycles.

For the present UOCAVA process, there are two mailing cycles, one for registration and the other for balloting. The balloting mail cycle occurs within a restricted time period, between the time the ballot is certified and election day. A mailing cycle consists of two legs; an outbound leg and inbound from the LEO. Any opportunity to improve this part of the process would be to shorten the mailing cycle or to eliminate cycles completely. To shorten a mailing cycle, it is conceivable to go to shorter mailing cycles by paying a higher postage rate using the USPS or a private freight service. This would immediately multiply the cost of mailing by a factor of ten (10), making an already expensive program much worse. The other problem is that this would not guarantee delivery as certain military or State department situations would interrupt the responsibility of the carrier.

The other possibility is to eliminate complete mailing cycles or legs. Elimination of a cycle or leg can be accomplished through the use of electronic formats, which is exactly the premise of an Internet voting system. However, as previously noted, a pure Internet approach is not acceptable unless specific security concerns are resolved.

There are two legs to each cycle and the outbound legs is essentially used to deliver a form to the OSV, whether it is an absentee ballot request or a ballot. In either case, at the completion of the outbound leg, the OSV ends up with a pre-printed form which must be completed and sent by return mail for the inbound leg of the mailing cycle. It is the outbound leg of each mailing cycle that can be replaced with an electronic delivery of the pre-printed form and maintain the security and integrity of election process.

Elections are a fundamental process by which governments decide who will govern, whether the general public will accept new legislation, whether constitutions will be amended, and other matters of high importance. Voters formerly wrote down their choices on a ballot and anonymously cast the ballot in a ballot box. The ballot was later retrieved and counted along with other cast ballots. This process embodied numerous problems. The process of counting votes to decide ballot issues was time consuming. In close elections, uncertainty over the correctness of the counts often required time consuming recounts in close elections. A single voter could sometimes cast numerous ballots because there was no comprehensive system to check for voter eligibility.

Election procedures have substantially changed in modern times. Modern elections are performed on a large scale with the aid of computerized systems. For example, U.S. Pat. No. 5,758,325 to Lohry et al. and U.S. Pat. No. 5,278,753 to Graft et al. show distributed hierarchical systems including a headquarters unit that oversees or governs the operations of multiple precinct units. In turn, the precinct units oversee or govern the operations of numerous voting booths. In both systems, data is transported between the headquarters unit and the precinct unit using a nonvolatile memory cartridge. This memory cartridge may include a CD ROM, EPROM, or other form of nonvolatile memory. Thus, communications that are transmitted by electronic signals between the precinct unit and the headquarters unit may later be confirmed after the precinct election data is delivered by hand to the headquarters. Security algorithms at headquarters verify that the nonvolatile memory module is authentic. This system prevents election tampering by the intercept of electronic signals.

A significant problem affecting democratic elections is low voter turnout. Many potential voters do not bother to register and, consequently, cannot vote. Other voters who are registered do not take the time to vote. This problem is related to the difficulty of voting because voters must often occupy several hours to travel to a precinct voting station, wait in line and vote. This problem occurs even when computerized voting systems are used.

One solution to low voter turnout is to provide easier access enabling more voters to participate in elections. This could be done using extant computer networks, e.g., the Internet, with appropriate security precautions in place. Nevertheless, use of non-dedicated or general-purpose computer networks has heretofore been impracticable because these networks are insecure. For example, a skilled programmer could assemble a computer virus that would disrupt a national election either by causing the system to crash or by transmitting false results. Trojan horse programs can be created appearing to provide some useful service, but actually executing unexpected and unwanted functions, and these programs can be distributed to reside on many hard drives. Absent authentication of ballot information, a possibility also exists that election fraud might be perpetrated by the use of software to generate ballots favoring one candidate over another.

There remains a need to provide a secure voting system that can be accessed over a network and, particularly, a general purpose or non-dedicated computer network.

OBJECTS OF THE INVENTION

Accordingly, an object of the present invention is to provide a secure balloting system that makes use of distributed network technology, such as the Internet, in the process of holding elections.

Another object is to provide a network-downloadable ballot viewer object having components that improve voter participation and turnout through ease of use in the election process.

Yet another object is to provide alternative method and apparatus for the casting of absentee ballots.

Additional ballot viewer objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, method and apparatus are provided that use a computer readable form to facilitate the casting of ballots in a secure way on network systems, e.g., the Internet.

In accordance with one aspect of the invention, the computer readable form embodies machine executable instructions for permitting voters to cast ballots in an election. The computer readable form embodies machine executable instructions for permitting a voter to cast a ballot by interaction with an official ballot image resulting in the creation of a cast vote record. The computer readable form is preferably packaged as a ballot viewer object that optionally includes, in combination with the executable instructions, data that cooperates with the executable instructions to authenticate the voter, display the official ballot image to the voter, permit the voter to create a cast vote record by interaction with the displayed ballot image until such time as the voter cast the ballot to produce a cast vote record, and transmits the ballot to as server. The computer readable form, in combination with the data for the executable code, may be uniquely created for each voter. Downloadable components of the ballot viewer object may include, for example, executable code, data, new virus definitions, voter authentication data, and ballot image data. The ballot viewer object may be downloaded as an email attachment or a downloadable file that is stored on a server.

The computer readable form may contain program instructions for authenticating the voter by comparing official voter authentication data against data that is input by the voter. Authentication may also be performed by comparing an official password against a password that is provided by the voter, by accessing a biometric authentication device such as a fingerprint analyzer. Alternative authentication instructions include those that access a device that is known to be in the possession of the voter, where the device may be selected from the group consisting of a smart card, an optical storage device, and a magnetic storage device. The voter identification information may be hashed, i.e., processed by a conventional hashing algorithm, and compared against voter input data that has been hashed by an identical algorithm.

The computer readable form may contain an official ballot image that presents the voter with all choices as they would appear on an absentee paper ballot that the voter would receive in an election. The contests resented to the voter are preferably only those in which the voter is eligible to vote.

Virus protection instructions of the computer readable form may optionally include instructions for checking video memory that is in association with a driver for a computer display against data for ballot selections that the voter has made. Thus, for example, in an election having two contestants A and B, the voter's selection choice for either candidate may be indicated by a 0 or a 1 in a corresponding byte that is allocated to the contest or a plurality of bytes allocated to each candidate. The corresponding video memory should show a corresponding mark allocated to the voter's choice, and a lack of such a mark in an indicator of corruption. Additional virus protection measures that are implemented by the program instructions may be selected from the group consisting of compiled sections of executable code with a plurality of static functions in different order, the insertion of junk functions into executable code, an absence of text tags to system function calls, serialized executable file names, serialized data file headers, virus checking upon execution of the computer readable form for viruses that are known to interact with the computer readable form, and means for comparing video memory to the ballot image that is displayed to the voter.

The program instruction may optionally but preferably include an encryption algorithm that is used to encrypt the cast vote record and/or the ballot viewer object prior to transmission. Preferred encryption algorithms are those that use public and private key encryption. The program instructions may include code for accessing a secure transmission protocol in transmitting the cast vote record to an election server.

The ballot viewer object preferably deletes itself upon transmission of the cast vote record.

In accordance with other aspects of the invention, a method and system are provided for use in voting through network telecommunications through use of the downloadable ballot viewer object that has been described above. The method and system use a combination of software and hardware that functions to download the ballot viewer object to the voter, authenticate the voter in association with the ballot viewer object, display to the voter an official ballot image derived from the ballot viewer object, create a cast vote record by voter interaction with the official ballot image, and transmit the cast vote record to an election server.

The method and system may download the ballot viewer object, for example, as an email attachment, or the ballot viewer object may be stored on a server that is accessible from the Internet. In the latter case the method and system may generate an email to notify a voter that the downloadable ballot viewer object has been stored on the server and is available for download, and password confirmation may be required prior to commencing the downloading step A transactional fee may be charged for at least one of the downloading and transmitting functions, especially where these functions are performed using an official service of the United States Postal Service, such as the POSTeCS system.

The downloading and transmitting functions are optionally but preferably performed using a secure transmission protocol, such as SSL.

The method and system may utilize program instructions for encrypting the ballot viewer object or cast vote record prior to transmission. The program instructions also preferably authenticate the voter by comparing the voter authentication information with interactive data input that is provided by the voter. As described above in the context of the ballot viewer object, the voter authentication information contained in the ballot viewer object may be hashed, and authentication may include hashing the interactive input from the voter for comparison purposes. The ballot image display preferably includes an electronic replica of an absentee paper ballot that a voter would receive in an election, and the program instructions may delete the ballot viewer object and cast vote record from a voter's computer once the transmitting step is complete.

The method and system may include program instructions for sending an email confirmation message to the voter upon receipt of the cast vote record that is transmitted by the voter, and this confirmation message may include a replication of the voter's cast vote record.

The combination of voter authorization information and official ballot image information that is assigned to a particular voter is normally unique for that voter. For example, the official ballot image information may consist of selected contests in which the voter is authorized to vote.

As mentioned above, method and system may use an official server that is authorized or operated by the United States Postal Service. Where the postal server is used, or in more general terms, an official postal server that authorized by a national government agency for the transmission of electronic data, an aspect of the invention comprises an improvement to existing systems in the form of an interface for batch control processing of electronic ballot information as directed by an election server. Alternatively, the Internet or direct-dial networking may be availed without necessarily resorting to an official postal server.

Specialized problem resolution procedures may be implemented to overcome a variety of problems that result form the use of network data transmissions, such as procedures to parse the cast vote record to identify corrupted ballot information, preventing a single voter from casting multiple ballots, notifying the voter that an ballot viewer object has been downloaded but the transmitting step has not been completed within a predetermined amount of time since the downloading step occurred, facilitating a subsequent download in the event of a download failure upon an initial attempt at performing the download step, and protection against virus attack. Virus remediation procedures include such measures as compiling sections of executable code with a plurality of static functions in different order, inserting junk functions into executable code, avoiding use of text tags to system function calls, using serialized executable file names, using serialized data file headers, checking upon execution of the computer readable form for viruses that are known to interact with the computer readable form, and comparing video memory to selection choice data for the ballot image that is displayed to the voter to confirm accuracy of the ballot image.

BRIEF DESCRIPTION OF THE DRAWINGS

The accompanying drawings, which are incorporated in and constitute a part of the specification, illustrate a presently preferred embodiments and methods of the invention and, together with the general description given above and the detailed description of the preferred embodiments and methods given below, serve to explain the principles of the invention.

DETAILED DESCRIPTION

Figure 1:
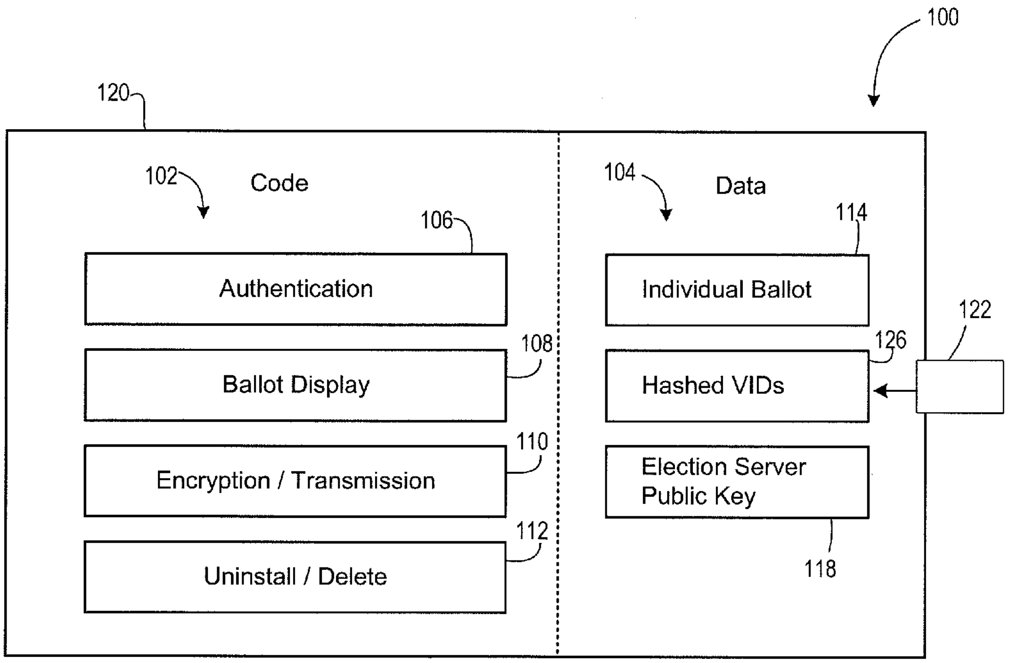
FIG. 1 is a schematic block diagram showing a preferred embodiment of a downloadable ballot viewer object for use according to the general principles described herein.

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

In accordance with one aspect of the invention, a computer readable form is provided that embodies machine instructions for permitting voters to cast votes. In this sense, the computer readable form may comprise any file that can be read by a computer including, for example, a file that resides on magnetic data storage media, optical data storage media, or a file that resides on paper and may interpreted by optical character recognition or by a bar-code scanner.

The computer readable form is a ballot viewer object including program instructions for use in processing data that may optionally be packaged with the computer readable form. The ballot viewer object preferably exists as a downloadable file, such as an email attachment, a file that is stored on a server, or a file (such as an applet) that may be downloaded in the consequence of interacting with an Internet Web page.

It is particularly preferred that the ballot viewer object is completely self, sustaining in the sense that it does not require continuing interaction with a server once a voter has received data, if needed, on which the executable code will operate and executed the executable code to commence voter authentication and the selection of ballot choices. The preference for a self-sustaining object does not preclude downloading of the ballot viewer object from a server, nor does it preclude the transmission of a sealed cast vote through a server.

The ballot viewer object uses executable code to authenticate a voter in association with authentication data that may optionally be provided as part of the ballot viewer object, code for displaying a official ballot image data to the voter, code for permitting a voter to enter votes by interaction with the ballot image that is displayed by the displaying means, and code for transmitting the resultant cast vote record to the election headquarters server. The executable code may be contained in the ballot viewer object itself or provided to the voter on a data storage medium, e.g., a CD-ROM or magnetic disk.

FIG. 1 depicts, by way of example, a ballot viewer object or computer readable form 100 including both machine-readable code 102 and data 104 for use in conjunction with the machine-readable code 102. The machine-readable code 102 and data 104 may be packaged as an email message with executable attachment that permit a voter to cast a vote in an election. The ballot viewer object 100 may be sent to the voter as an email attachment. The machine-readable code 102, by way of example, preferably includes program instruction modules for voter authentication 106, ballot image display 108, ballot encryption/transmission 110, and uninstall/delete 112 functions. The data 104 includes an individual ballot 114, security measures such as hashed voter identification data (VID data) 116, and election server public key 118. These elements and their functions are explained below in additional detail. It is worth noting at the present time, however, that the ballot viewer object 100 may itself comprise other ballot viewer objects, such as an imaging ballot viewer object formed as the combination of the ballot display module 110 and the individual ballot 114. The ballot viewer object 100 may also comprise a plurality of separate program files and data files that are not necessarily transmitted in a single package, i.e., the line 120 surrounding these elements is a logical and not a physical line.

The ballot viewer object 100 provides familiarity and comfort to voters and election officials through use of an electronic ballot having similar characteristics with respect to the characteristics of a paper absentee ballot. Ballot viewer object 100 is transmitted to the voter, for example, as either an email attachment or as a downloaded file that is accessed as an Internet web page form. Once ballot viewer object 100 resides on the voter's computer and is executed, the voter is able to vote by being authenticated and presented with an interactive ballot image. The voter enters his selection and casts the votes and "seal" the ballot to protect against further modification of the cast vote record. The voter's act of casting votes preferably causes the executable code 102 to seal the ballot by encrypting the voter's cast ballot. The sealed ballot including the cast vote record is transmitted to the election server, and the ballot viewer object 100 then deletes itself, leaving little or no trace. This process is very similar to voting by a paper absentee ballot, which is opened, voted on and sealed up in an envelope and returned. Voters and election officials who are mistrustful of network voting systems find familiarity and comfort with this system due to the aforementioned analogies to absentee voting through paper ballots.

The authentication module 106 prompts the user for data input and compares this input to hashed VID data 116. The VID data 116 might comprise, for example, Social Security numbers, Date of Birth, Zip Code, a Personal Identification Number (PIN) issued by the Election Authority, or the voter's personal password sent to an election authority by the voter via postal mail. If the voter's computer system has a smart-card interface, a smart card 122 may be used to store a voter's private decryption key, such that the election server would encrypt the VID 116 data using the voter's public key 118. The private key could also potentially be stored on a floppy disk or similar storage medium. It is possible that some sensitive data, such as the user's personal password, might be input by the user, not used for authentication on the voter's system, and used in a second layer of authentication at the election server. Ballot viewer object 100 preferably executes the ballot display module 108 once the voter authentication is complete.

The ballot display module 108 preferably displays a ballot image in the same way that a paper absentee ballot would be displayed, with appropriate minor modifications, such as paging, to accommodate voter interactivity and the presentation of ballot choices to the voter. The ballot display module 108 converts the individual ballot data 114 into a form that can be displayed to the voter using a computer. The ballot display module 108 interactively allows the user to make his or her vote selections, and change selections prior to casting or sealing the ballot.

The ballot display module 110 preferably supports all regular types of ballot logic, the placing of write-in candidates, multiple languages and any other requirements for a particular jurisdiction, all according to data provided in the individual ballot module 114. The ballot display module 108 supports all types of conventional election logic, e.g., vote for one candidate in a particular contest, N of M voting, exact N of M voting, dependent races, etc. . . . , where N is the minimum or exact number selections that may be made in a race containing M candidates, e.g., a race with instructions to choose exactly 2 out of 5 choices for this race. A commercially available display system, e.g., the well known Adobe PDF (portable document format), may be used to present the ballot information, or individual screens may be programmed using any language, such as Basic, Fortran, or Cobol, with object-oriented languages such as C++, XML, or Java being preferred.

The voter interacts with the ballot in a conventional manner for casting electronic votes, for example, according to voting processes that exist in commercially available election systems from Hart InterCivic of Austin, Tex. When the voter has completed interaction with the ballot image by marking or selecting the votes being cast, the voter may select an option to cast the ballot and, consequently, seal the ballot image. At this point processing of the ballot image transfers to the encryption/transmission module 110.

The first step in "sealing" the ballot is to encrypt the cast ballot using the election server public key 118. If a smart card interface is available on the voter's system for smart card 122, it is also possible to digitally sign the ballot using the voter's private key. Once encryption/digital signing is complete, ballot viewer object 100 transmits the cast vote record directly over the Internet. The preferred transmission process is to use a secure connection, such as an SSL connection. Ballot viewer object 100 establishes an Internet connection for this transmission if one is not already active. Alternatively, the ballot viewer object 100 transmits the encrypted ballot image as an email attachment using any conventional email package. The encryption/transmission module 110 may contain code for the transmission of the ballot image as an email attachment or regular email.

Once the cast ballot has been transmitted, ballot viewer object 100 preferably deletes itself to leave no trace on the voter's host computer. Complete deletion in the case of Windows[1] operating systems may require a stub uninstall program to be left on the machine in an unobtrusive place until the next reboot.

[1] WINDOWS is a trademark of Microsoft Corporation located in Redmond, Wash.

The individual ballot 114 may be any type of information that is readable by the ballot display module 108. According to conventional practices for creating electronic ballots, generally, the ballots are created at an election headquarters using a separate software program that automatically assembles the election data into the various ballot styles that are required for the multiplicity of voter eligibility in an election.

According to the aspect of the invention embodied by ballot viewer object 100, these ballot styles are preferably saved as a single file and transferred to a program on the election server that sends individual ballot viewer objects, such as ballot viewer object 100, as ballot-mail to individual voters. The election headquarters program has a record of each voter who has requested a ballot. The election headquarters program then merges each voter's information with their ballot style to create an executable ballot viewer object 100 that is specific to each voter according to voter authentication and eligibility to vote in specific elections. For example, in a statewide election, a voter who resides in a particular city may be asked to vote on local municipal bond issues, whereas other voters who do not reside in that city are not entitled to vote on those bond issues. Thus, the voter preferably receives a ballot that displays only those contests for which the voter is eligible to vote. Election jurisdictions normally track this information according to conventional voting practices.

The hashed VID information 116 is hashed to make it neither visible nor obtainable directly by anyone who is illicitly viewing the data. The voter repeats entry of this data as part of the authorization module 106, and the entered data is hashed and compared to the stored hashes of the voter identification information 116. Alternatively, if a smart-card 122 is available, the voter identification information 116 can be encrypted using the voter's public key, and then decrypted at the user's computer for authentication.

In still other implementations, a CD-ROM or floppy disk that is physically mailed to the voter can replace the smart card 122. The disk may contain ballot viewer object 100, as well as authentication information in the form of hashed VID's or any other form, together with encryption key information.

The election server public key 118 is optionally and preferably used to encrypt the ballot or cast vote record prior to transmission. Any conventional data encryption algorithm may be used.

As indicated above, a portion of the executable code 102 that comprises ballot viewer object 100 functions as a ballot viewer in the form of an interactive display of ballot information to the voter. The code is optionally but preferably capable of executing on different operating systems, such as those that are commonly employed on Windows, Macintosh, Unix, Linux or other commercially available operating systems. The code is optionally but preferably configured, as needed, to be capable of interacting with technologies that franchise disabled voters, such as speech recognition software, text to audio conversion software, head switches, breath switches, and toggle switches. The code is also capable of implementing voter logic, such as the prevention of multiple selections in a contest where only a single vote may be cast. The code is preferably fault tolerant in the sense that a crash or other fault of the voter's computer during the voting process does not leave ballot viewer object 100 in an undetermined state or allow the transmission of an incorrect or corrupted ballot. Once the voter has cast a ballot, the code optionally but preferably encrypts at least the ballot data prior to transmission. The code also deletes itself upon transmission of the cast ballot to eliminate all traces of ballot viewer object 100 and the cast vote record from the voter's computer after voting.

One of the most serious problems that could occur in the use of ballot viewer object 100 is that the voter's computer could become infected with a virus or Trojan horse. This virus might, for example, detect ballot viewer object 100 on the voter's computer, and insert code that compromises the integrity of election results. This virus could also detect the execution of code within ballot viewer object 100, terminate the execution, and open the virus's own "spoof" program—a program that interacts with the voter in the same manner as ballot viewer object 100 but provides its own cast vote record regardless of the voter input. In this way, the voter could be tricked into casting votes that do not correspond to election choices made by the voter. Certain precautions can mitigate or eliminate this threat.

For a virus to detect an executable ballot viewer object 100, and then insert a malicious code to subvert the voter's intentions, the virus-writing programmer must do two things. He or she must be able to detect the executable itself, and he or she must be able to replace specific functions in the executable or replace specific function calls by inserting false addresses into a function call table. Just randomly inserting code into any executable almost always results in a damaged and non-functional executable. The idea of non-similar binaries is intended to make the latter task more difficult for virus-writing programmers.

In order to write a virus that inserts code into a specific place in the executable code of ballot viewer object 100, the virus writer must know exactly where to place the insertion. If each ballot viewer object 100 executable in a plurality of ballot viewer objects 100 is subtly different, then a virus that was written with one ballot viewer object 100 example in mind will most likely fail in another non-similar executable. Thus, each section of executable code 102 is preferably compiled with various static functions being in different order. In addition, during the compilation of each such executable, various "junk functions" are compiled into the executable, i.e., functions that do not have active uses during voting, but are there simply to confuse any resident viruses. In this way, a virus will not be able to insert code to replace specific functions or function calls, but can only insert in a random fashion, which will almost certainly not create an executable subverted code. Every different voter could receive a different executable if the system that generates the executable code assigns a unique identifier to function calls in the code, or a plurality of different executables could be randomly distributed for use in an election.

It should also be noted that all text tags to functions, as generally exist within Windows.dll (dynamic link libraries) should not exist in the executable code of ballot viewer object 100.

As indicated by the discussion above, the first thing a virus must do is identify the executable. A virus might use several techniques to identify an executable. Additional precautions may be taken to serialize the executables such that these identification points change with each download. Unique file names can be serialized such that each file in the executable code 102 of ballot viewer object 100 has a unique name. This name should be fairly unique, so that viruses cannot search using a simple ****.exe template or similar technique. Similarly, the file sizes can be altered so that the file sizes of each executable does not retain the exact same number of bytes. Data file headers can be serialized in similar fashion.

Notifying voters that their ballot has been cast and replicating the votes that the voter has cast within such notification may mitigate virus "spoofing". Voter's can be emailed that their ballot has been properly cast. The election authority sends out this notification once the ballot has been properly received. Furthermore, if the election headquarters has not received a voter's ballot by a certain day, the headquarters can email the voter and remind him to vote. If voter thinks (because of virus "spoofing") that he has already voted, this could lead to fixing his problem. An election web site can be created to show any voter whether they have properly cast their ballot, and the ballot has been properly received.

As ballot viewer object 100 is executed, the first process it optionally but preferably implements is to connect with the election headquarters server and download the latest definitions for potential election viruses. A scan of the voter's machine is then done using these latest virus definitions prior to the voter being allowed to cast his ballot.

A virus could potentially imitate the user's ballot image and collect the user's authentication information, which it would later use to allow the virus to vote as it has been programmed to vote. When the virus actually casts the corrupted ballot, it is not likely to display the corrupted ballot selections on the screen, as this would be an obvious clue to the voter that something was amiss. Therefore, ballot viewer object 100 preferably but optionally takes snapshots of portions of video memory and compares the information thus obtained to what should be displayed on the user's computer to confirm that the ballot is actually being displayed to the user, instead of being hijacked by a virus. The voter is presented with a virus corruption error if the ballot selection data does not match.

The ballot viewer object 100 may be provided to the voter on a CD-ROM at the time of voter registration, or the voter may download the ballot viewer object 100 from a server. In cases where a CD-ROM is provided to the voter, the CD-ROM may provide a more robust range of related functionalities that are not limited by the excessive download times that would be required to download the associated code in instances where the ballot is posted on a server for eventual download. In either case, additional functionalities may include help functions, such as video help or on-CD html help, and a virus protection engine. The virus protection engine includes the actual program that will check for viruses, but an up-to-date virus definition file is preferably downloaded at the time when voting actually occurs. The CD-ROM is also a mechanism for transmitting a secure PKI private key for encryption purposes, whereas transmission of the key is otherwise insecure and problematic.

Where the voter has received a CD-ROM that contains the executable code 102, the ballot viewer object 100 that is downloaded prior to actual voting may consist of the ballot image data 104 and/or new virus definitions. The voter's download is advantageously smaller. Additionally, the problem is avoided of having the voter pick the proper download for a particular operating system because multiple operating system CD's can be created.

As indicated above, the CD-ROM may be advantageously provided with a private key for encryption purposes. PKI is a preferred solution to voter encryption and authentication, but it relies upon the secrecy of the voter's private key. A virus or Trojan horse may steal a private key that resides on the voter's computer. While in possession of this key, the virus or Trojan horse can digitally sign the ballot on behalf of the voter and decrypt any messages to the voter that were encrypted using the voter's public key.

A solution to this problem, according to some embodiments, is to implement a "ball and chain" concept. According to this concept, a very large random number is generated to include a large amount of data, e.g., perhaps 100 MB to 300 MB of data. The voter's unique private key is embedded in this number, which is stored on the CD. As part of the authentication process at the time of voting, the election headquarters server asks the local executable program from the CD-ROM on the voter's computer to check and return a specific few bytes out of the random number that is stored on the CD. The executable code returns these few bytes as part of the cast, returned ballot. The election headquarters server checks the data content of these few bytes against the known "ball and chain" bytes that the election headquarters server embedded into the random number. The voter may be authenticated using the results of a matching comparison. The significance of the large amount of data in the "ball and chain" is that a virus which is programmed to steal the voter's identity and vote for the voter without benefit of the CD will require an unduly large amount of time to accomplish the data transfer under certain conditions. This large transfer time is required because, without knowing where the election headquarters server will prompt the local executable to look for the key, the virus has to steal the entire random number. Where the virus resides on the Internet or another networked computer, the entire random number is not easy to steal. For example, a 100 MB random number would require approximately 13 hours for transmission on a 28.8 Kbps line.

According to another aspect of the invention in its various embodiments, a ballot viewer object, such as ballot viewer object 100, is used to configure a computer system to download executable program instructions, interact with a voter for the casting of votes, and transmit a secure encrypted file during the course of an election. The system and method permit voting through use of network telecommunications to transmit a downloadable ballot viewer object containing an official ballot image, voter authentication information, and executable code for use in casting a ballot. The system and method incorporate steps of downloading the ballot viewer object, authenticating the voter in association with the ballot viewer object, displaying an official ballot image derived from the ballot viewer object, creating a cast vote record by voter interaction with the official ballot image; and transmitting the cast vote record to an election server.

Figure 2:
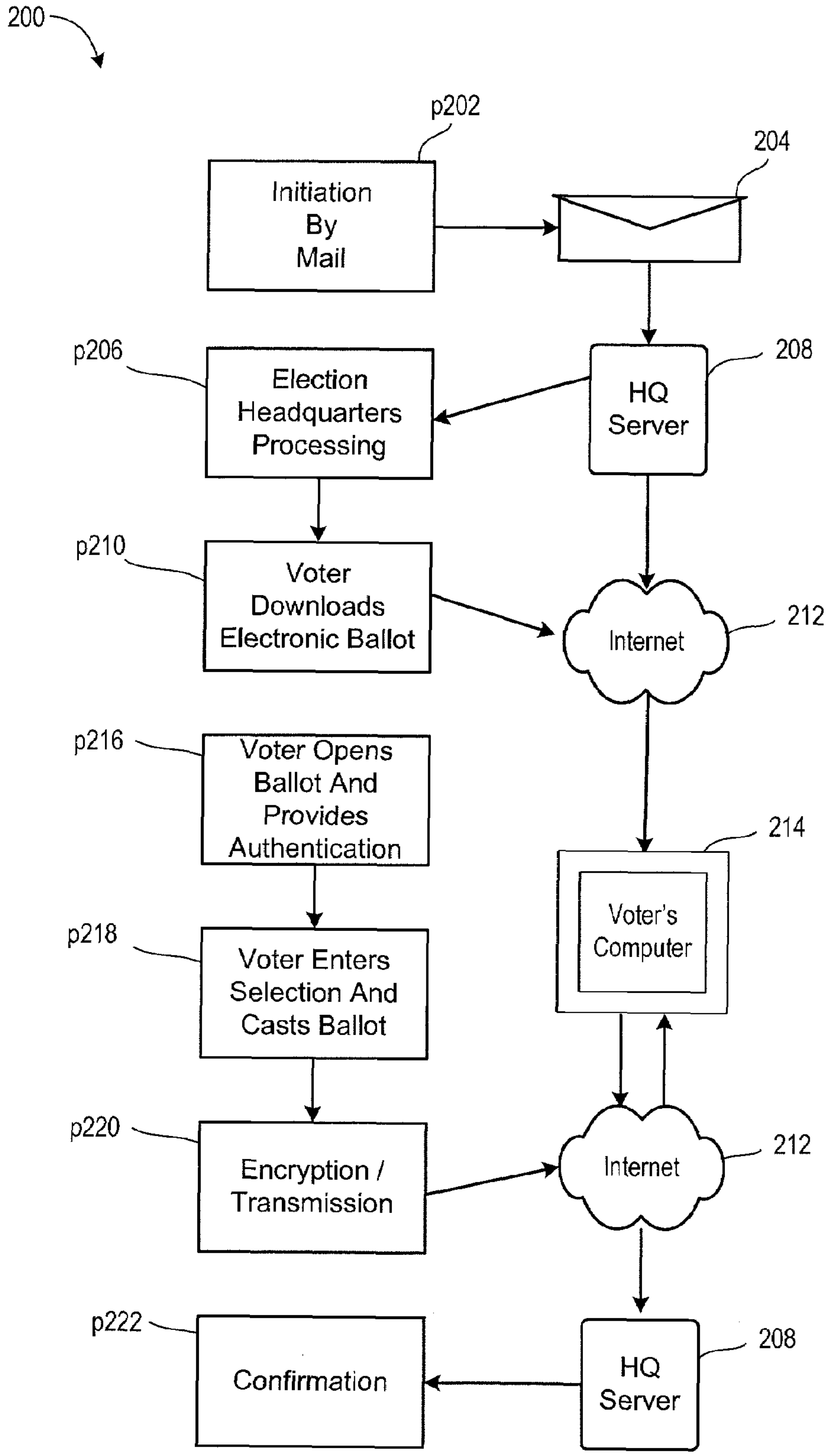
FIG. 2 is a schematic process diagram showing an interaction between a method of operation for the ballot viewer object of FIG. 1 and system apparatus.

FIG. 2 is a process schematic diagram showing an electronic ballot mailing process and system P200. A voter initiates process P200 with a process step P202 including the submission of a document 204 by personal delivery at election headquarters or by regular mail, e.g., through the United States postal service or a private courier agency, such as Federal Express. Document 204 contains voter identification information that can be verified, at least in part, by information in the possession of election headquarters 204, such as a Social Security number, Date of Birth, Zip Code, or a Personal Identification Number (PIN) that issued by the election authority.

Process step P206 commences with the arrival of document 204 at election headquarters 208 or an office that is affiliated with election headquarters, such as a voter registrar's office. Alternatively, as mentioned above, the election headquarters functionality depicted in FIG. 2 may be substituted by interaction with a CD-ROM or another storage medium that is prepared by the election headquarters. Step P206 includes processing the information in document 204 to create an ballot viewer object, such as ballot viewer object 100, or to store the data that is required for the subsequent creation of the ballot viewer object 100.

Step P210 entails the voter downloading the ballot viewer object, e.g., using the Internet 212, or alternative telecommunications arrangements such as intranets, local area networks, direct modem connection, or virtual private networks. The ballot viewer object arrives at the voter's computer 214 by virtue of this transfer.

The voter opens the ballot viewer object and undergoes authentication in process step P216, which preferably includes a comparison of voter responses to verify the authentication information that the headquarters server 208 has transmitted with the ballot viewer object 100, but may also include interactive verification of information that is compared with information stored only on the election server 208. The authentication information that is transmitted may be encrypted with the voter's public key, so that it may be decrypted using the voter's private key stored on a smart card or other medium, or hashes of the authentication information may be sent instead of the authentication information itself.

After authentication, process step P218 includes voter interaction with the ballot viewer object 100 to enter selections and cast the ballot. Once the ballot is cast, encryption/transmission of the ballot image occurs in process step P220, and the ballot image or data is transmitted through the Internet 212 for return to the headquarters server 208 of the completed ballot image. The headquarters server 208, or another server for this purpose, processes the ballot image, processes the votes for election vote tallying or accumulation purposes (e.g., by performing an actual tally or preparing the information for tallying by another computer) and, optionally but preferably in step P222, sends a message in the form of an email to the voter's computer confirming that the ballot was cast and entered in the election. The confirmation message may be encrypted with the Election Server's private key (digitally signed) such that the voter may be assured it has been sent from the official election headquarters. The confirmation optionally includes a record of the votes that the voter cast in the election.

Figure 3:
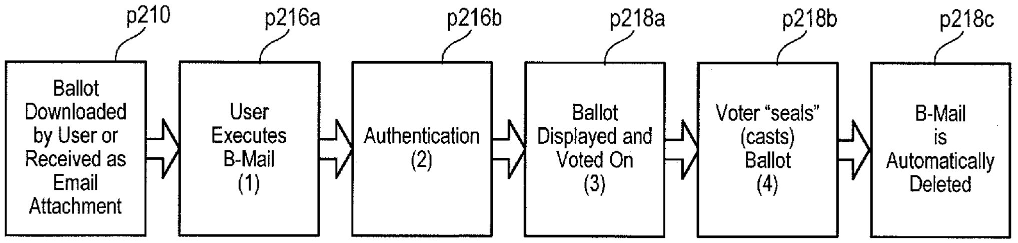
FIG. 3 is a schematic process diagram providing additional detail with respect to FIG. 2.

FIG. 3 provides additional detail with respect to preferred features of process steps P210-P218 of FIG. 2. The process steps shown in FIG. 3 mimic, in an electronic sense, the process of voting by conventional absentee ballot using a paper ballot that is transmitted by regular mail. The voter downloads (receives) the ballot in step P210. The voter opens the ballot in step P216*a*, e.g., by double-clicking an icon in a standard Windows operating system. The ballot itself authenticates the voter in step P216*b*, e.g., by comparing voter identification data entered by the voter against hashed or encrypted data stored with the ballot viewer object. Optionally, the ballot viewer object could authenticate by reading hardware control numbers in a smart card, floppy disk, or CD-ROM that is in the possession of the voter. In contrast, a paper ballot cannot be self-authenticating, so the practice of this embodiment in its preferred aspects provides additional security that cannot be found in paper absentee ballot voting methodologies as they are currently implemented. The ballot is displayed and voted on in step P218*a* where the interactive ballot image appears as would a standard paper ballot. The voter seals the ballot in step P218*b*, and the ballot image, which is hereby defined as any data representation of the ballot, is encrypted, digitally signed and transmitted back to the election headquarters server 208 in step P218*b*. Alternatively, the ballot viewer object 100 may simply make the encrypted ballot image available for use as an email attachment, which the voter affirmatively sends to the election headquarters. The ballot viewer object, e.g., ballot viewer object 100, automatically deletes itself in step P218*c*.

Figure 4:
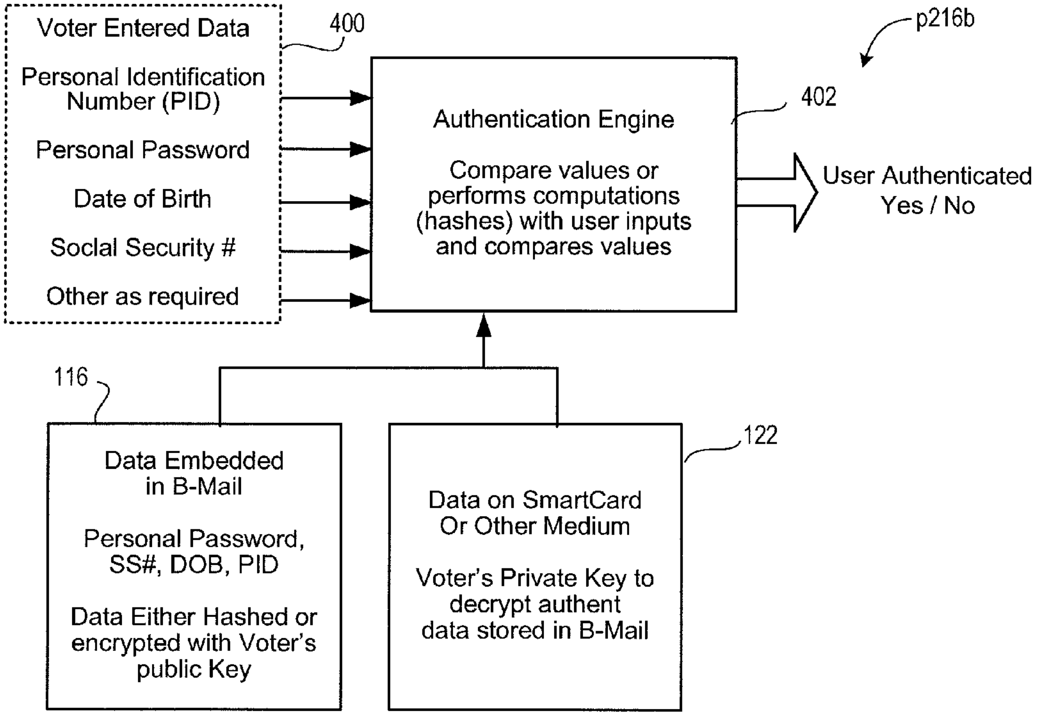
FIG. 4 is a schematic block diagram showing additional detail with respect to voter authentication in a preferred embodiment of the ballot viewer object shown in FIG. 1.

FIG. 4 provides additional detail with respect to a form of ballot viewer object 100 for use in performing the authentication step P216*b*. The executable code 102 of ballot viewer object 100 prompts the voter to enter voter identification data 400. The election headquarters has delivered to the voter a personal identification number (PIN) through regular postal mail or by hand delivery upon personal appearance of the voter. Alternatively, a voter PIN does not have to be sent if the voter possesses a private key, such as data on a smart card or other medium, or an image on a biometric identification device, such as a voice analyzer, fingerprint analyzer or retinal analyzer. In this case, the election authority normally approves the procedures that are used by the certifying authority that is responsible for authenticating the keyholder. Possession of the PIN or key provides substantial assurances that the individual who provides this information is the intended voter. The voter preferably also sends a personal password to the election headquarters. This password is an optional extension that is available to the jurisdictions for authentication purposes. Other authentication data can be required including any information about a voter that is available to the jurisdiction running the election, but such data should not be easy for others to locate. This data includes such information as voter's address, mother's maiden name, children's birthdays, etc.

The hashed VID data 116 or other forms of protected identification data are preferably embedded in the ballot viewer object 100 and are not stored in clear text that could be read by a computer program or by a sophisticated computer developer or intruder. One option is to provide only a secure hash of data. An authentication engine 402 then hashes the user's inputs by an identical hashing algorithm and the hash values of the user's inputs are compared to the stored values. Another option is available when a voter has a smart card reader, floppy or CD, such as may be supplied to the voter with a corresponding smart-card 122, floppy or CD including the voter's private key. The authentication data that is provided in ballot viewer object 100 is encrypted using the voter's public key, and then decrypted in the authentication module using the voter's private key, e.g., by a commercially available encryption program such as Pretty Good Privacy (PGP). In addition, the authentication data in ballot viewer object 100 is optionally and preferably encrypted using the election authorities' private key. The authentication engine decrypts the authentication data using the election headquarters' public key.

Figure 5:
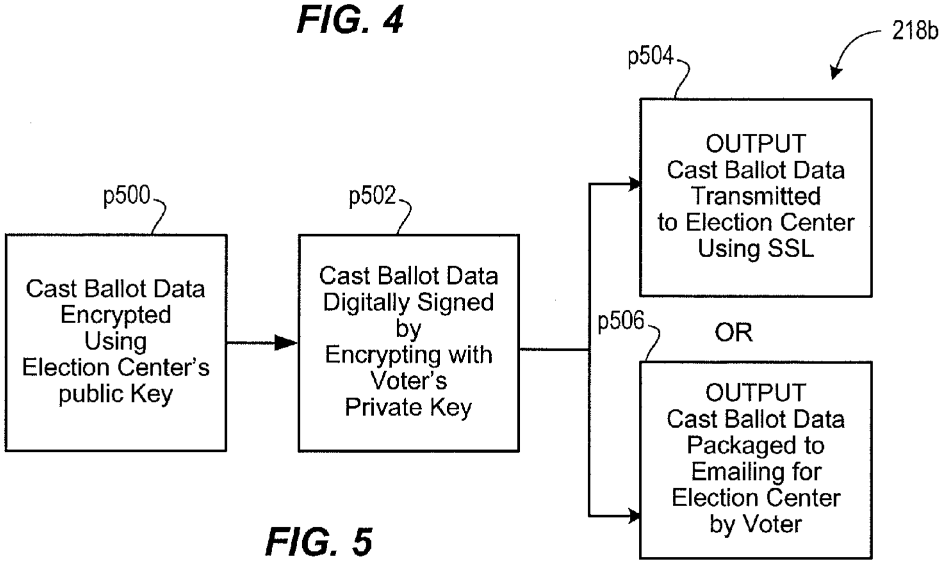
FIG. 5 is a schematic process diagram providing additional detail with respect to casting ballots in a preferred embodiment of the process shown in FIG. 2.

FIG. 5 provides additional detail with respect to a preferred procedure for use in sealing or casting the ballot, e.g., as by step P218*b* of FIG. 3. Certain forms of well known encryption technology, such as PKI or PGP, use a key that is accessed by an algorithm to process the message being encrypted or decrypted according to complex algorithms. Thus, even though a public key may be known, it remains difficult or impossible to use this key for the purpose of decrypting an encrypted massage. Therefore, the cast ballot image is preferably encrypted in process step P500 using key encryption technology. The ballot image may be further encrypted or alternatively encrypted in step P502 using the voter's private key, but only if the voter has knowledge or possession of his or her private key, e.g., from memory or as encoded in a smart card. The encrypted ballot image may be automatically transmitted to the election headquarters using a very secure SSL link in process step P504 or, alternatively, the encrypted ballot may be packaged in step P506 as an email attachment for transmission to the election headquarters. In addition to packaging the cast ballot data as an encrypted message, it is contemplated that the voter's authentication data is to be also packaged for transmission. This packaging would provide some of the same identification of the sender that digital signing would provide, but not as stringently. This might be helpful in cases where the voter does not have a smart card or other means of storing a private key. It is important to note is that the voter can not alter any votes or vote again once the ballot has been sealed or encrypted, which creates a situation that is identical to the situation that exists when a voter manually places a paper ballot in a ballot box.

In yet another aspect of the invention according to its various embodiments, the previously described instrumentalities may be implemented as improvements to existing postal service email servers. In an official postal server authorized by a national government agency for the transmission of electronic data, the improvements comprise an interface for batch control processing of electronic ballot information as directed by an election server.

The United States Postal Service (USPS) has developed through interaction with the private sector a secure electronic document transfer service named POSTeCS[2], which may optionally be used to secure the communications channels from election headquarters to the voter and return. The POSTeCS system operates as an electronic mail delivery service and can be used to transfer the ballot to the voter and return the voter's cast ballot to the election. For example, the voter may receive an email that contains a unique URL that is associated with a downloadable form of ballot viewer object 100. The server containing the URL is preferably configured to only transmit the data if a proper SSL link is established between server and the voter's computer. Thus, whenever the user clicks the unique URL link, an SSL session will be established to secure the transmission of the ballot viewer object 100.

[2] POSTeCS is a trademark of the United States Postal service.

In more general terms, the POSTeCS service allows a vendor to send an email message to a customer. The message points the customer to an electronic download. The customer's actions of receiving the email, opening the email, and downloading the file are tracked by the USPS, which provides information on the status of the transfer to the customer. The download information is encrypted and transmitted securely, for example using SSL, and the downloads are encrypted while they reside on the USPS server. Before the customer is allowed to download the file, the customer may be asked to enter a password. The USPS charges a transactional fee similar to postage for this service.

Using the USPS POSTeCS system, the download may also be electronically signed by the customer, or encrypted by the customer. In addition, the USPS may encrypt the download so that it can only be decrypted on the user's computer via the user's private key. Electronically signing the document or encrypting the download requires that the user have a digital certificate in the form of a public/private key pair. In addition, the downloadable program may only be accessible during a certain time window that is defined by the vendor.

Involvement of the USPS in transmitting messages, such as ballot viewer object 100, has important advantages, specifically legal ones. The laws protecting mail fraud cover POSTeCS communications. Thus, stiff criminal and civil penalties regarding theft and alteration of postal mail help reduce potential voter fraud using paper absentee ballots, as well as electronic ballots in the form of ballot viewer object 100. These penalties give a high degree of comfort to government officials who are concerned with voter fraud in Internet voting systems.

Figure 6:
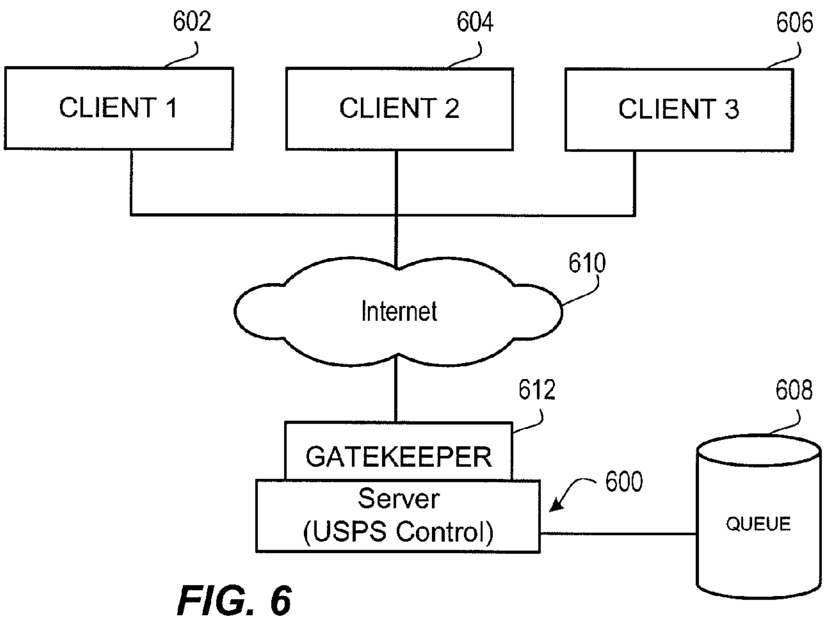
FIG. 6 is a block schematic diagram showing general system components of a secure data transmission system and service that is commercially available from the United States Postal Service (USPS) and subject to modification for the implementation of a preferred embodiment according to an aspect of the invention.

FIG. 6 depicts a general overview of the major operational components relating to the POSTeCS server 600. These components are subject to modification, as described below, to improve operability of the POSTeCS server 600 for purposes of the preferred embodiments of the invention. Any other server or system having similar functionality may replace the POSTeCS server 600. By analogy, the POSTeCS server 600 functions as a normal email server, however, various functions have been added to permit the USPS to charge a transactional fee in transmitting secure email. The POSTeCS server acts as a postman would in carrying and delivering a letter for a fee.

The POSTeCS server 600 resides on a server (or servers) 602, which functions as an electronic mail server in support of a plurality of clients, e.g., clients 602, 604, and 606, who wish to send and receive messages. A queuing agent 608, e.g. a conventional message database, may be used to temporarily store message data. Standard messaging protocols are used to transmit and receive messages through the Internet 610 among the respective clients 602-606. Secure transmission protocols, such as SSL, are normally utilized to preserve the confidentiality and integrity of information in transit. Altogether, these components, as described thus far, may be offered by any email service provider. The POSTeCS server 600 differs from other servers because it is under the control of the United States Postal Service and, consequently, postal service laws and regulations attach to the transmission of information through the server 600. Furthermore, the server 600 is provided with a gatekeeper functionality 612 that is capable of charging transactional fees for the transmission of information. These fees are charged to authorized accounts. The server 600 could be used for purposes of the present invention according to its various embodiments in unmodified form, however, the account authorization processes that are presently required are, in practice, so cumbersome and unwieldy that they are not practicable for use in a large-scale election.

At present, the POSTeCS sever requires a sender to post a message on the queuing agent, the POSTeCS server 600 notifies the intended recipient via email that the message exists for download under specified conditions and times, and the recipient connects to the POSTeCS server 600 to download the message. The sender is charged a transactional fee. Thus, with the present POSTeCS product on the POSTeCS server 600, once a voter has cast a ballot, the voter would have to go through a very cumbersome process to register with POSTeCS as a data sender, and then pay to send the cast ballot record to the election headquarters server 208. The election headquarters would then have to download the posted cast ballot record.

The existing POSTeCS system may be modified to implement the concept of replicating electronically the "self-addressed stamped envelope," which would permit the voter to act as a customer in voting by absentee ballot with a transactional fee through simplified batch processes excluding the cumbersome registration and downloading processes. Charges may, for example, be prepaid by the voter at the time of voter registration or directed to a charge card that the voter authorizes for use at the time of registering to vote.

Figure 7:
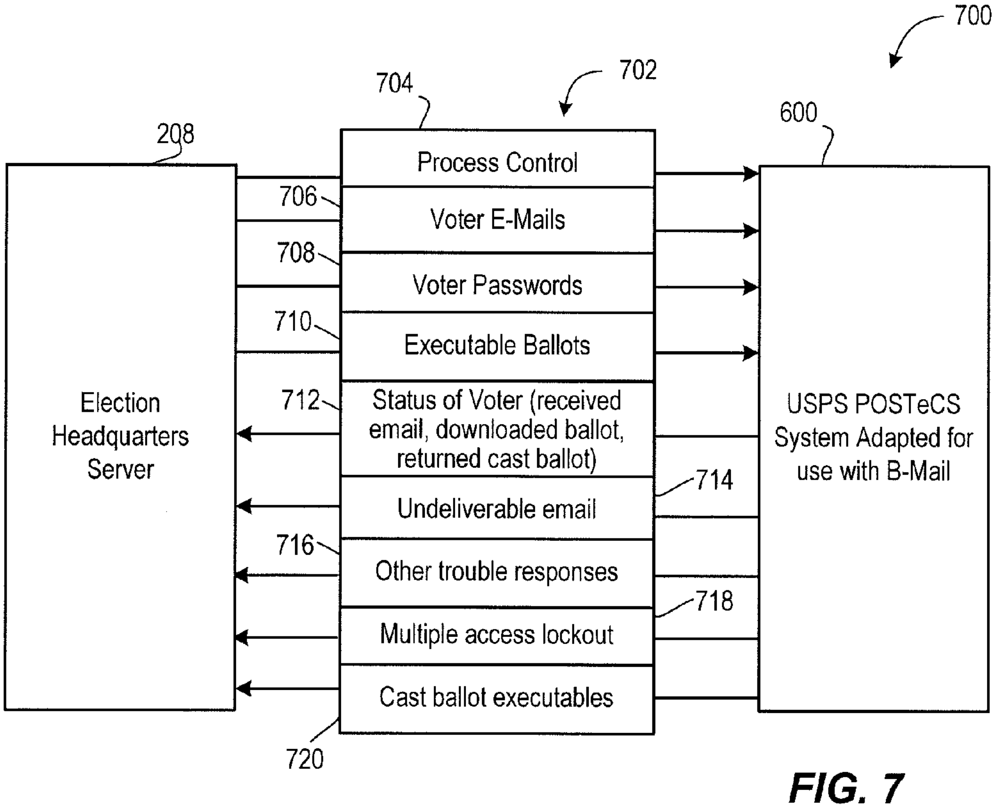
FIG. 7 is a block diagram showing an interface between an election server and the system that is shown in FIG. 6.

FIG. 7 depicts a voter interface 700 constituting, by way of example, a modification to the existing POSTeCS system, which may be implemented as a new type of client 602 or a modification to an existing one of the clients. FIG. 7 describes functional interaction between the headquarters election server and the POSTeCS server 600. In this embodiment, POSTeCS server 600 is used as a pipeline or conduit in sending and receiving ballot mail messages, such as ballot viewer object 100. The interface 700 is optionally and preferably created to perform the operations of functional stack 702 in an automated manner that does not require human intervention, except as described below.

A process control function 704 resides on the headquarters server 208 such that the election headquarters server 208 operates as a vendor on the POSTeCS server 600. Thus, the election headquarters server 208 has the power to initiate transactions in the form of transmitting electronic ballots, such as ballot viewer object 100 by way of example, and to direct charges as appropriate. For example, charges may be made to a governmental agency and/or to the voter's account along preauthorized lines. In other instances, the election headquarters may receive revenue in the form of a service fee that is charged to a governmental agency or to the voter or both. The process control also preferably includes authentication of the election headquarters server, which may require manual data input, such as a password or encryption key. The process control function 704 also includes periodic polling of the POSTeCS server 600 for transmission of return messages from POSTeCS server 600. The executable code 102 of ballot viewer object 100 may be programmed with an identifier, such as a randomly assigned URL, which causes POSTeCS server 600 to receive return messages from the voter and ballot viewer object 100 as though they originate from the election headquarters vendor for fee information purposes in instances where fees are applicable.

Once the process control function 704 authorizes the connection with the election headquarters server 208, function 706 entails the transmission of voter emails, which may be coupled with an electronic ballot such as ballot viewer object 100. These emails are preferably but optionally transmitted as a batch job that originates from pre-transmission services at election headquarters. Function 708 is a preferred but optional function comprising the transmission of voter passwords, such that a voter receiving the email in the form of ballot viewer object 100 can provide the POSTeCS server 600 with a password that may optionally be required to download ballot viewer object 100 from the POSTeCS server 600. The password may be obtained from the voter at the time the voter registers for electronic voting, the password may be created at the election headquarters and mailed to the voter, or the password may be emailed to the voter using key encryption.

Function 710 includes the creation of executable ballots, such as ballot viewer object 100, which may be combined as attachments with the voter emails that are generated by function 706 or stored in a queue, e.g., database 616 (see FIG. 6), for eventual downloading by the voter. In this latter case, the voter may pay a fee for the download and the initial email that is generated by function 706 may be transmitted free of charge to the voter.

Function 712 includes the receipt of tracking information at the election headquarters server 208 from the POSTeCS server 600. As previously indicated, the POSTeCS server 600 tracks the status of messages that have been sent to a customer who in this case is the voter, and POSTeCS server 600 periodically submits this tracking information to the election headquarters server 208. The tracking information includes a status report as to whether the voter has received the email that was generated by function 706, whether the voter has downloaded the executable ballot that was generated by function 710, and whether the voter has returned a cast ballot. Thus, the election headquarters server 208 is able to ascertain whether the voter has voted and permits each voter to vote only one time by verifying whether a particular voter has voted in the election.

A variety of problems may arise in the transmission of the voter emails from function 706, and the election headquarters server 208 is configured to take appropriate action when these troubles arise. For example, when POSTeCS server 600 returns an email as undeliverable, function 714 produces a report identifying the voter. This report may be accessed for manual verification that the email was sent to the intended address. If the address was entered into the election server 208 incorrectly, then manual intervention may be used to correct the address and the email may be sent to the correct address through function 706. If the address is verified as being the one that the voter intended, a telephone call may be placed to resolve the issue or the election headquarters server may generate a letter for delivery to the voter by regular mail requesting the voter to provide a usable address. Function 716 provides responses to other troubles that may arise, such as responses to user inquiries where a voter has difficulty in executing the code 102 on a particular machine or operating system, and may comprise in interactive online help system or access to a help hotline. Another trouble that may arise includes the receipt of corrupted data by the voter or the election headquarters. In this case, function 716 provides for the diagnosis of corrupted data and implements appropriate resolution procedures, such as sending a email to a voter through function 706 requesting the voter to download another ballot viewer object 100 for purposes of re-voting.

A multiple access lockout functionality 718 uses the tracking information that is generated by the status report function 712 to assure that each voter is only permitted to cast one ballot. For example, an identifier that is unique to each voter may be activated when the voter downloads an executable ballot that is generated by function 710. This identifier is then deactivated when the voter returns a cast ballot. Either the election headquarters server 208 or the POSTeCS server 600 may be configured to automatically delete messages from voters having inactivated identifiers. Similarly, the election headquarters server 208 or the POSTeCS server 600 may be configured to delete messages originating from voters who have not downloaded the executable ballots that were generated by function 710. This deletion of unauthorized messages mitigates or eliminates at least one form of denial of service attack by persons who wish to overload the systems by transmitting numerous unauthorized messages to the election headquarters. In case an attack of this nature is attempted, the function 718 may optionally, as opposed to deleting the messages outright, store the messages on a firewall server and parse the messages to obtain information regarding the sender and the transmission pathway for use in investigation by police agencies.

Function 720 entails the receipt of cast ballot executables, such as cast ballot image data that is received from ballot viewer object 100. The election headquarters server 208 automatically scans this data to assure that it is not corrupted, in which case function 716 is invoked. Where the scan validates the data, the votes are processed tallied for inclusion in election totals according to conventional electronic vote accumulation and storage techniques, which may be performed on the election headquarters server 218 or other computers. Prior to tallying votes, voter identification information is separated from the ballot data including the votes. This separation is performed to protect voter anonymity. While a separation of this type may occur at any time during the process, it is preferred to perform the separation when the cast ballot executable is received because this feature permits notification to the voter in case the ballot data is corrupted and it permits the election server 208 to notify the voter that the cast ballot has been received and processed.

With the exception of voter status and trouble responses, the bulk of the sensitive data is preferably transferred via very secure channels. The executable packages in the form of ballot viewer object 100, voter emails and passwords can all be received in batch, perhaps on a CD delivered by a secure carrier, which is hand-carried from the election headquarters to the POSTeCS server 600. Similarly, the receiving of cast ballots by election headquarters could also be via a very secure channel, by manual delivery of physical data (e.g., on optical disk such as a CD, flash memory, or magnetic data storage), or via a dedicated telephone line.

Figure 8:
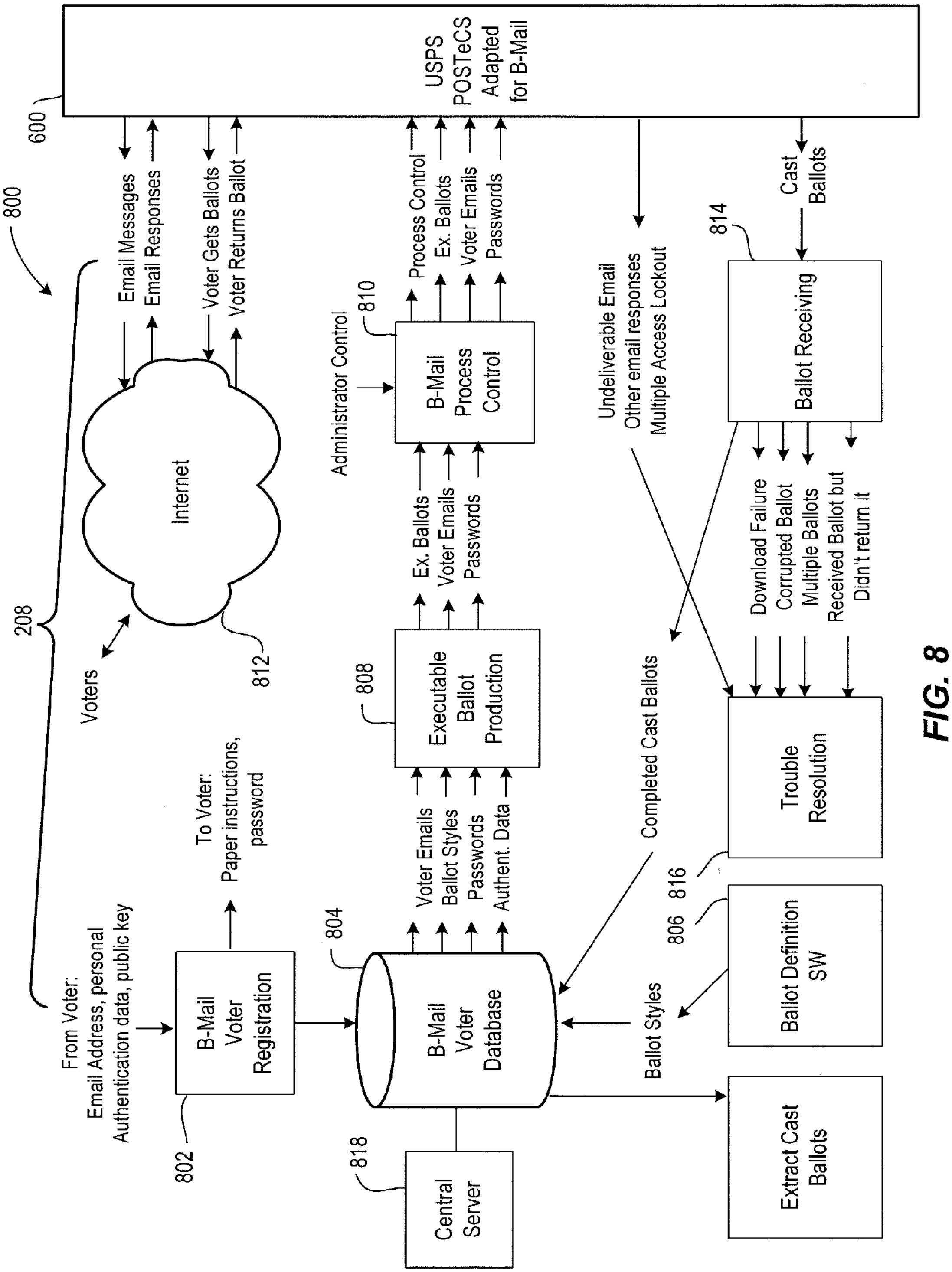
FIG. 8 is a block diagram providing additional detail with respect to a systematic implementation of the interface shown in FIG. 6.

FIG. 8 is a block schematic diagram depicting, by way of example, a system implementation in greater detail than that which is shown in FIG. 7. The system 800 may be configured to reside on a single server, which operates as both the election headquarters server 208 and the POSTeCS server 600, or the functions may be divided among a plurality of different servers. The functions are performed by software and hardware that reside on the various servers according to respective implementations.

A registration block 802 permits the voter to register for electronic voting through use of an electronic ballot, such as ballot viewer object 100, which may be transmitted through the use of email. As used herein, the term "B-Mail" is used to identify the use of executable packages in the nature of ballot viewer object 100 and includes packages that are transmitted through the use of email, as well as packages that are transmitted by other electronic means. The voter registration process for B-Mail is similar to that used for paper absentee ballots, or for mail voting in general. Once authenticated by an election official, the voter will provide an email address, further voter authentication information (mother's maiden name, town of birth, SS#, etc.) and, optionally, a digital certificate including a pubic and private key for encryption purposes. The last two items may or may not be supported or required by a particular governmental agency for use in voting. The election headquarters server 208 then generates a paper confirmation including a voter password for opening the executable code 102 of ballot viewer object 100. If the voter does not have an email address, the election headquarters server may provide the voter with written instructions for downloading ballot viewer object 100 directly from the Internet.

Upon registration, the election headquarters server 208, optionally but preferably, notifies the voter by generating a paper letter showing the primary password that the voter uses to download an executable ballot. This paper is mailed to the voter by manual means, hand delivered upon personal appearance of the voter, or email can be used particularly where the password can be protected by encryption. If the voter does not have an email address, the election headquarters server 208 generates a voter-specific uniform resource locator (URL) for the voter's downloadable ballot, and this URL may be given directly to the voter on paper. The voter can then vote using any Internet-connected computer and need not have an email address. If the voter has an extant digital certificate (public/private key pair) for PKI encryption purposes, the voter will have to so indicate and supply the public key to the registration officials. Alternatively, a governmental agency, the election headquarters server, or the USPS provides these digital certificates to the voter.

A secure database 804 includes all voter identification information, passwords generated by the voter registration system, other voter authentication information, and a table that records the voter's voting status, e.g., as having registered, been provided with an electronic ballot for download, downloaded an electronic ballot, cast a ballot, or having transmitted corrupted ballot data.

The executable code 102 of ballot viewer object 100 includes a ballot viewer segment that replicates electronic ballot information according to the voter's residence and eligibility to participate in specific elections. These various ballot styles may be generated on commercial order, for example, by contacting Hart InterCivic of Austin, Tex., which specializes in producing multiple ballots for use in a single jurisdiction and has developed proprietary software for purposes of generating these ballots. Thus, data or executable code 806 corresponding to plurality of ballot styles resides or is accessed by the database 804. Once the voter has cast a valid ballot, the valid cast-vote record including all votes cast will also preferably reside on the database 804, but with no relation to the voter. The valid ballot is optionally but preferably encrypted in such a way as to be unreadable from the database without encryption key information.

An executable ballot production block 808 is a reporting function that accesses the information from database 804 to generate ballot viewer object 100, which optionally but preferably contains a particular ballot style corresponding to the voter's eligibility for voting in a predetermined list of elections. Ballot viewer object 100 also contains hashed VID data as discussed above, password authentication, and other authentication data as deemed appropriate by the election authority. Thus, the ballot production block 808 produces a unique serialized executable program that the user can use to cast his or her ballot The ballot production block 808 also provides an email message notifying the voter that the ballot viewer object 100 has been made-ready for download and also informs the voter of the dates during which a download may occur.

A process control block 810 receives input from the election authority or election administrator and controls the election. The administrator input sets start and stop dates, as well as voting times for the election are set. Various optional settings are made through this component, as required for the conduct of an election pursuant to election statutes and regulations. The process control block 810 communicates directly with the USPS POSTeCS server 600 by sending process control information along with executable ballots and voter emails and passwords. The ballots, emails and passwords may be sent in bulk to the USPS system via a very secure channel or even hand-carried, as discussed above. In turn, the POSTeCS server 600 transmits the email messages to the respective voters using the Internet 812 and conventional transmission protocols.

The voter opens the URL that was sent to him via email from the POSTeCS server 600. This URL opens to a password access screen that is provided as part of the client interface. If the user enters the correct password, an interface is displayed that shows the ballot viewer object 100 for download. Optionally, more than one ballot viewer object 100 can be provided for download, as the user may be using a PC, a Mac or other supported machine running a different operating system. In preferred embodiments, the downloading function enforces a virus checking procedure to assure that the voter's machine is clean and free of viruses. The user downloads the correct version of ballot viewer object 100 for his or her operating system. The POSTeCS services of POSTeCS server 600 that are preferably used in combination with the downloading process include downloading a Java Applet onto the voter's computer prior to download, and certifying that the download is protected by SSL communication encryption.

The voter then executes the downloaded ballot viewer object 100. An authentication screen is shown, asking the user for specific personal information. Depending on the implementation, the voter may be denied access at that time if incorrect data is entered, or the determination of authenticity may be done after voting, by software on the election headquarters server 208. Once the user has completed entering the correct authentication information, the voter is presented with an electronic ballot. The voter makes all of his or her selections, and casts the ballot, as prompted by interaction with ballot viewer object 100.

Once the ballot is sealed, ballot viewer object 100 processes the completed ballot or cast-vote record for return to the POSTeCS server 600 through the Internet 600. As required, the voter may receive notification that the ballot has been received and properly entered at election headquarters.

The election headquarters server receives the cast vote record information from the POSTeCS server 600 and processes the same through use of a ballot-receiving block 814, which certifies the cast vote record as being 'valid' prior to applying the cast votes to election tallies. A valid ballot in this context means a ballot that is not damaged or corrupted, and where the voter has correctly authenticated him/herself. In addition, as previously mentioned, the ballot-receiving block 814 module detects and resolves the problems of multiple ballots being returned, as well as other problems. The valid cast vote record information is delivered to the database 804 for eventual extraction and tabulation.

The ballot receiving block 814 forwards to the trouble resolution block 816 a variety of action matters, as described above, including download failure, corrupted ballots, and multiple cast ballots. Additionally, the trouble resolution block 816 is capable of acting upon multiple categories of feedback from the POSTeCS server 600, such as notices showing the voter's email was undeliverable, or that a failure occurred when the voter was downloading the ballot viewer object 100. The trouble resolution block responds appropriately to these matters, as needed, and acts in compliance with local laws, regulations, and practices concerning these issues by analogy to absentee voting practices.

Upon the close of an election, the valid cast vote records are stored in the database 804. These ballots are preferably stored in an encrypted format using a public key that may be accessed by the election headquarters server 208 or a separate server 818. In cases where a separate server 818 is used, this server is preferably a central server that may, for example, tally the election results from a plurality of precincts where the election headquarters server 208 resides at the precinct level. Alternatively, the cast vote records may be processed by the election headquarters server or the separate server 818, stored on any storage medium, and hand-carried to another computer that tallies or accumulates the votes in an election. The election headquarters server 208 may also provide this central function of accumulating the cast vote records. Server 818 or 208 gathers the cast vote records, decrypts them, and extracts the data for conversion into a conventional format for tabulation of electronic votes.

It will be appreciated that the foregoing discussion is directed towards the preferred embodiments, and the method and apparatus may be modified to accomplish the same or substantially the same results. For example, the authentication of voter information need not precede the selection of votes, and authentication can occur at any level of process P200. Similarly, even though certain functions, such as the casting of ballots in step P216, are depicted as occurring on the voter's computer, the engine for execution of ballot viewer object 100 can reside on any CPU in a distributed processing environment. Any form of encryption may be used and, although encryption is not absolutely required, it much preferred to assure the integrity of large elections.

Figure 9:
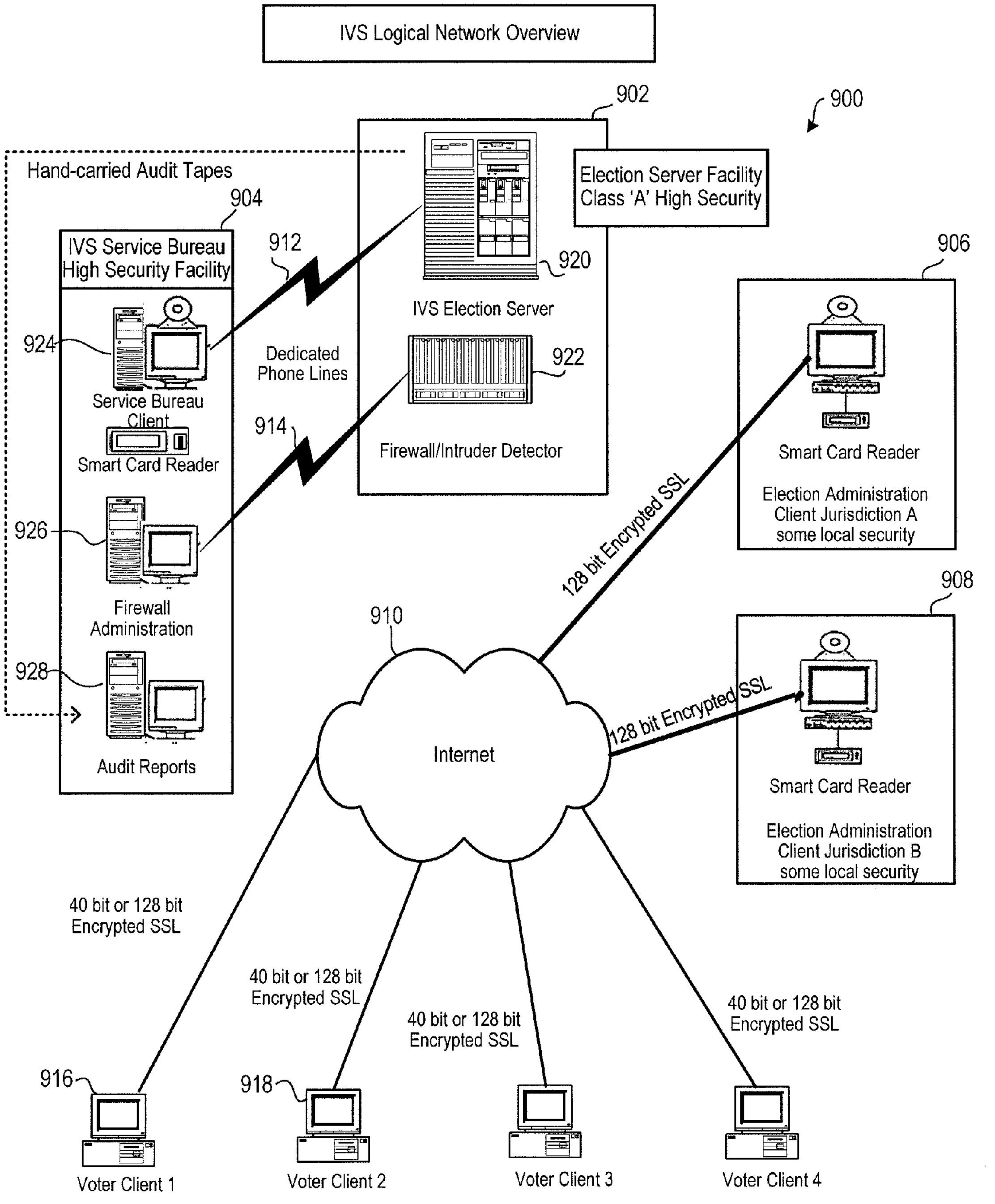
FIG. 9 is a system schematic diagram of an Internet voting system according to principles of the invention.

The foregoing discussion has emphasized that a CD-ROM may be used to FIG. 9 depicts an overview of a logical IVS network 900. A central election server facility 902 is provided with a high level of physical and electronic security. This election server facility 902 is used to collect votes on a particular election. The election server facility 902 is validated by an IVS service bureau 904, which also transmits and receives election data to and from election server facility 902. A plurality of election administration clients, e.g., election administration clients 906 and 908 with local security are used to verify voters for particular elections with respect to a particular precinct or other local jurisdiction. All elements of IVS network 900 are connected by the Internet 910, except the election server facility 902 and IVS service bureau 904 are connected by dedicated lines 912 and 914. A plurality of voter clients, e.g., voter clients 916 and 918, are routed to appropriate election administration clients 906 and 908 by Internet addressing.

The election server facility 902 includes an IVS election server 920 that is coupled with a firewall intruder detector 922 to establish a telecommunications connection with the Internet 910. IVS election server 920 is used as a local server to perform election services collecting votes from voter clients 916 and 918. The firewall intruder 922 detector is a telecommunications front end that also has various security algorithms in place to verify and authenticate the voter clients. Multiple elections may be performed using a single election server 920 or a single election may be performed using a distributed network of election servers 920, as needed to handle the load.

Service bureau 904 is a central facility that interfaces with election server facility 902 to provide and collect data. A service bureau client 924 is connected with IVS election server 920 by a dedicated line 912. This service bureau client contains a plurality of ballot images for different elections, authentication codes, and telecommunications addresses, as well as all other data that is required to perform a secure election ion the Internet 910. In addition to receiving data from the service Bureau client 924, the IVS election server 920 also transmits election data to the service bureau client 924. Similarly, the firewall intruder detector 922 is coupled with a firewall administration server 926 via dedicated line 914 for the transmission of secure data including client authentication codes and all other data that is required for firewall administration. Tape or other storage devices, e.g., nonvolatile memory modules, are carried from the IVS election server 920 to an auditing device 928, which compares this data to that which is received by service bureau client 924. This audit prevents election tampering in the unlikely event that signals on dedicated line 912 are intercepted and manipulated.

Local jurisdictions, e.g., precincts, are sometimes unable or unwilling to provide up to date information concerning voter eligibility to the IVS service bureau 904. For example, a state agency may be prohibited by law from dispensing voter lists. The local jurisdiction may also have a duty or requirement to itself verify voter eligibility and monitor or control progress of the election. For example, a local administrator may wish to deactivate the election system and close voting at a specified time. Local election clients 906 and 908 are incorporated into the system for purposes of establishing control at local levels FIG. 10 demonstrates a process 1000 including multiple authentication layers 1002 for the login and authentication of voter clients. For example, voter client 916 contacts the IVS election server 902 through the Internet 910. There is an initial voter client login 1004 including the transmission of a voter name followed by password verification 1006. These steps 204 and 206 verify that the voter client at least knows the password. Authentication is preferably performed by the IVS election server 920, but may also be done by the firewall intruder detector 922 even with assistance from local election administration clients 906 or 908. Additional voter verification fields are verified in step 1008. These additional fields include the use of smart cards at each voter client; personal voter information such as mother's maiden name and birthdate; biometerics; and special ID codes that verify a read only disk, e.g., a CD ROM, which is allocated to a particular voter client and password. Once used, the CD ROM ID code is deactivated at the IVS server 920 or other suitable location on the network, and the CD ROM cannot be used for additional voting.

These additional voter identification fields also include machine-specific information, such as a Pentium ID code, which is stored along with the vote. In this manner, the machine specific information may be investigated where it develops that a single computer is being used to cast a large number of votes. This type of machine specific information creates a substantial likelihood that anyone who attempts to interfere with an election in a large way will be investigated and caught.

The aforementioned security precautions might be defeated by malicious software running on a voter client machine or even on an Internet server. For example, a false Pentium ID code could be created using random alphanumeric sequences in an attempt to avoid investigation triggered by multiple votes from a single Pentium ID. According to principles of the invention, malicious software is prevented from running by using a read only storage device, e.g., a CD ROM, to boot each voter client machine. Use of the read only storage device does not permit other programs to run while the election program is running. It is also preferable that all computers in system 100 are booted from similar read only storage devices.

Figure 11:
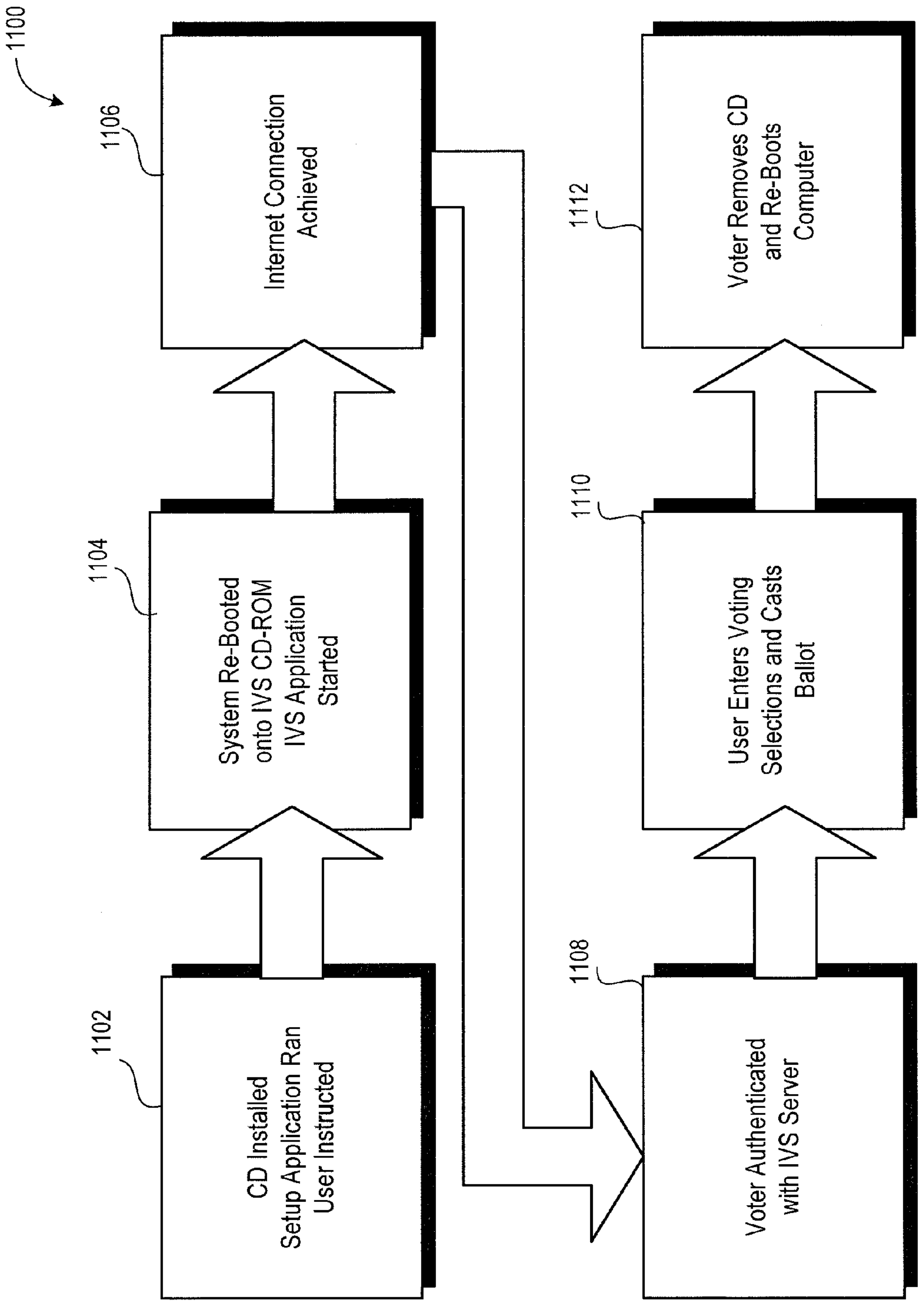
FIG. 11 is a schematic diagram of a process for Internet voting using a bootable CD ROM or other read only storage device to prevent the operation of malicious software.

FIG. 11 is a schematic diagram of a process 1100 for Internet voting using a bootable CD ROM or other read only storage device to prevent the operation of malicious software. The first part of this process 1100 is performed in step 1102. A voter client user, e.g., of voter client 916 (see FIG. 1) receives a CD ROM by mail or by hand delivery from the voting registrar. The user inserts this CD ROM into a disk drive on the user's computer in step 1102. A program on the CD ROM runs and gathers information on the local system BIOS, network, modem connections, and configuration. This program autoruns, if possible. The setup program then instructs the user how to start the real IVS system program.

The real IVS system program is started in step 1104 by rebooting the system onto the IVS CD ROM. The IVS application on the CD ROM is booted from the operating system on the CD ROM. An Internet connection is automatically achieved in step 1106, and the voter client is authenticated with the IVS server pursuant to step 1108 in the manner depicted by FIG. 10. The voter client/user may also fail authentication in step 1108 in which case the process 1100 terminates and IVS election server 902 deactivates the CD ROM to prevent it from being used. Authenticated voter clients proceed to step 1110 for the entry of voting selections based upon a ballot image that is preferably contained on the CD ROM, but may also be transported to the voter client over the Internet. The user casts the ballot to conclude step 1110. The user is then instructed to remove the CD ROM from the disk drive and reboot the machine in step 1112.

Figure 12:
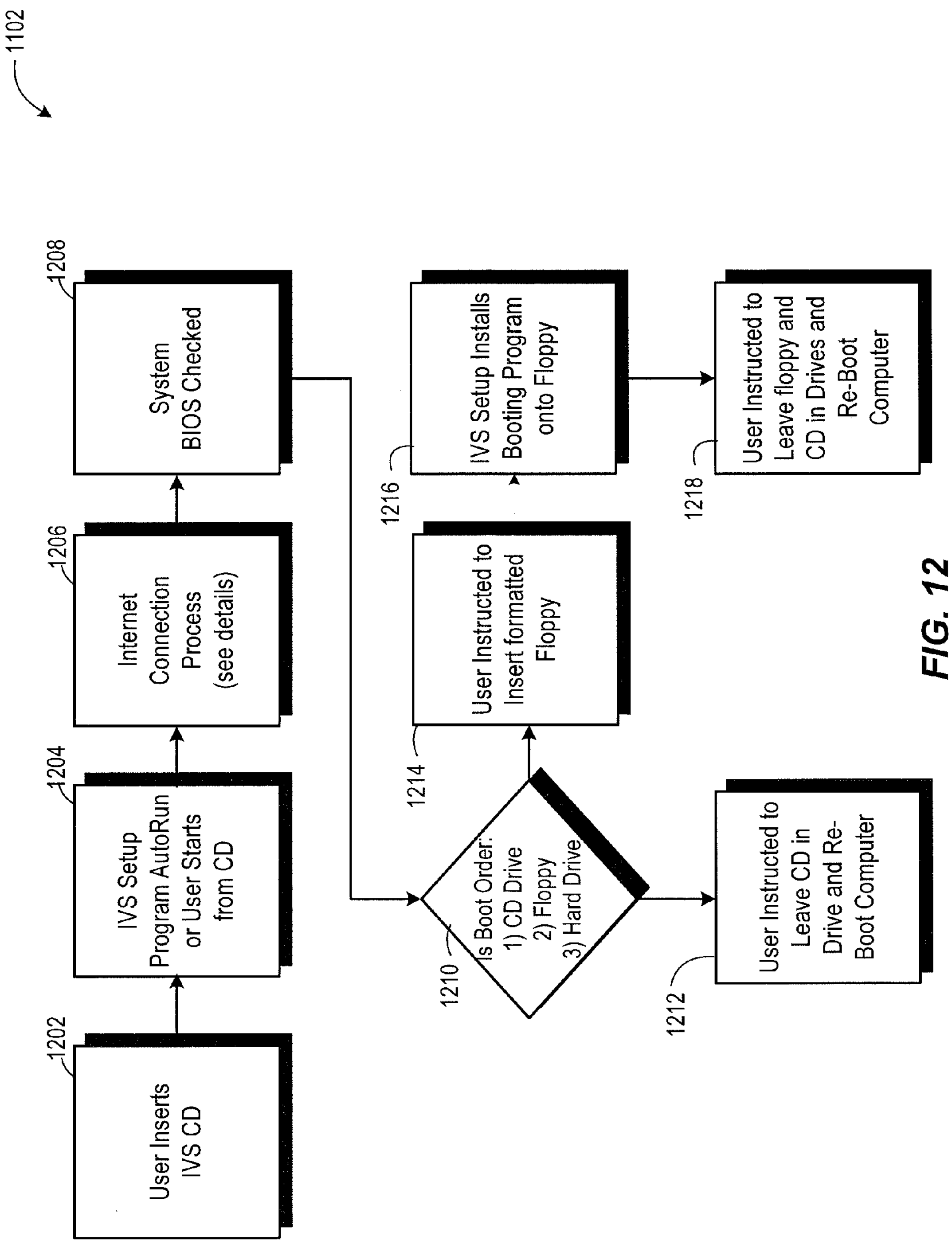
FIG. 12 is a schematic process diagram showing operation of the system of FIG. 9.

FIG. 12 is a process diagram that provides additional detail with respect to a preferred process for implementing step 1102 involving a preboot sequence of operations focusing upon "El Torito" compliant systems. A copy of that specification by C. E. Stevans and S. Merkin, "El Torito" Bootable CD ROM format Specification Version 1.0, IBM and Phoenix 20 pp. (1995) is incorporated by reference to the same extent as though fully disclosed herein.

In step 1202, the user inserts the IVS CD into an appropriate disk drive on a running computer to execute a setup program on the IVS CD. This IVS setup program runs in step 1204 by an autorun capability, or the user may manually execute the program if the autorun capability is unavailable. The setup program activates the voter client Internet connection in step 1206 and checks the system BIOS in step 1208. As determined in step 1210, if the system is capable of booting from the CD ROM, the user is instructed to leave the CD ROM in the drive, remove all floppy disks, and reboot the computer in step 1212. On the other hand, if the system BIOS does not support the "El Torito" bootable CD ROM specification, or if the BIOS boot order does not permit the voter client to boot from CD ROM prior to hard drive booting, then the IVS setup program instructs the user to insert a clean, formatted floppy disk in a floppy drive having boot capability in step 1214. In step 1216, the IVS setup program then copies onto the floppy a copy of the original El Torito compliant boot image that the CD carries. Pursuant to the El Torito specification, the boot image is sized to fit on a floppy, and any real operating system boot can only occur after the boot image is executed. This copying permits the system to boot from the IVS floppy, as needed, upon reboot of the system. The IVS setup program instructs the user to leave the floppy in the floppy drive, leave the CD ROM in the CD drive, and reboot the system in step 1218.

If the voter client system is El Torito compliant but still does not boot from CD ROM, it is possible for the IVS setup program to alter the system BIOS settings on some machines, in order to change the EL Torito compliant BIOS's boot order and require the CD to boot first. Completion of these commands will make it possible to execute step 1212 from step 1210. If the user is required to make an IVS floppy, then the IVS setup program directs the user to leave both the floppy and the CD in their respective drives and reboot the local system.

Figure 13:
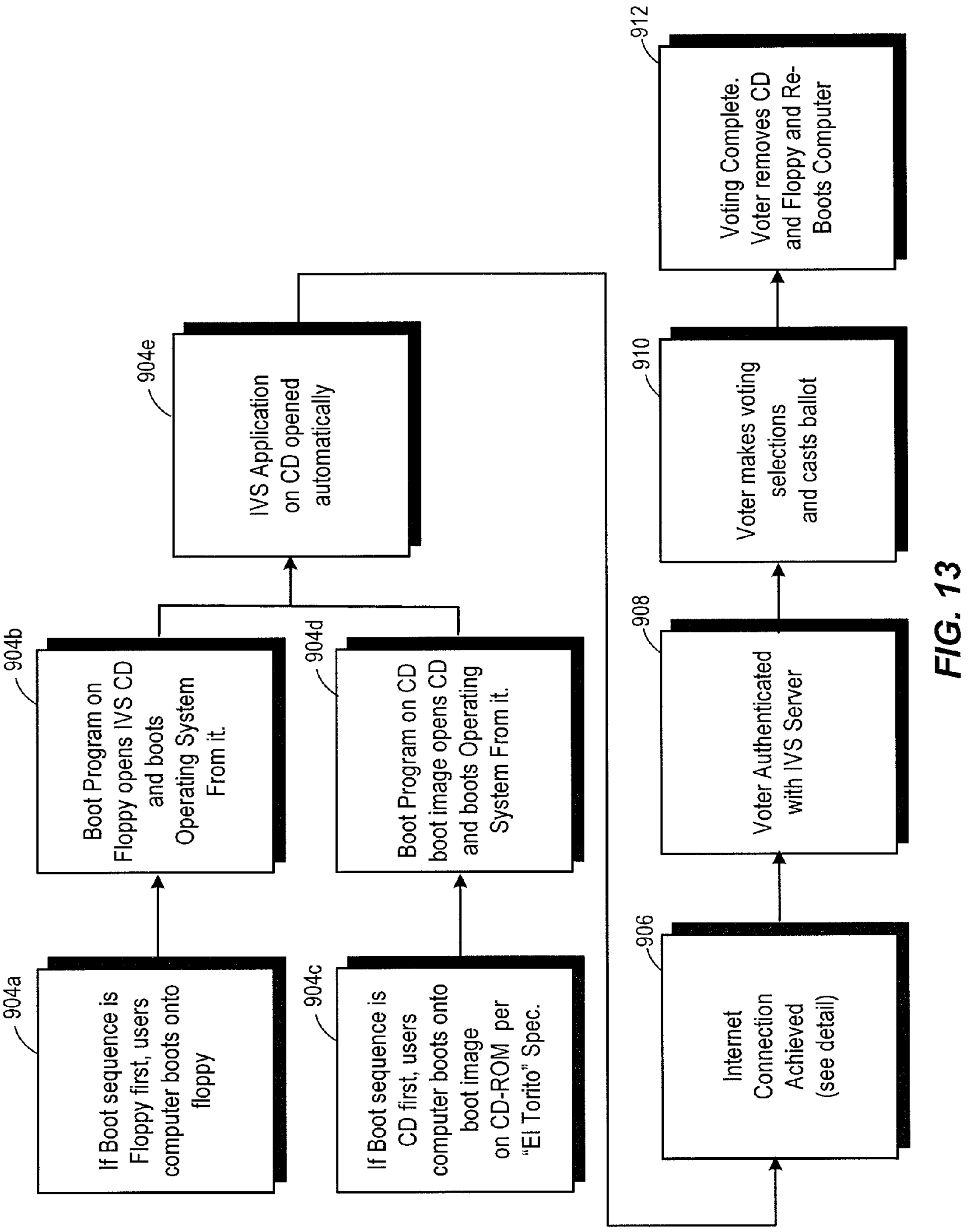
FIG. 13 provides additional detail with respect to a process step from FIG. 12.

FIG. 13 provides additional detail with respect to FIG. 9 involving the post boot process of step 904, which is now broken into steps 904*a*, 904*b*, 904*c*, 904*d* and 904*e*. In step 904*a*, if the voter client permits booting from floppy as provided for in step 902, the boot program on the floppy opens the IVS CD and boots the operating system from the CD using the boot disk image from the CD. The operating system on the CD opens the IVS voting application program on the CD in step 904*e*. In step 904*c*, if the voter client permits booting from the CD as provided for in step 902, the boot program on the floppy opens the IVS CD and boots the operating system from the CD in step 904*d* using the floppy sized boot image. The system reads this image like a floppy disk. The boot image has CD-ROM drivers that permit the IVS application program to be read and executed. Initialization procedures during the operating system startup execute the IVS application in step 904*e*. The remaining steps are as discussed in regard to FIG. 9.

Figure 10:
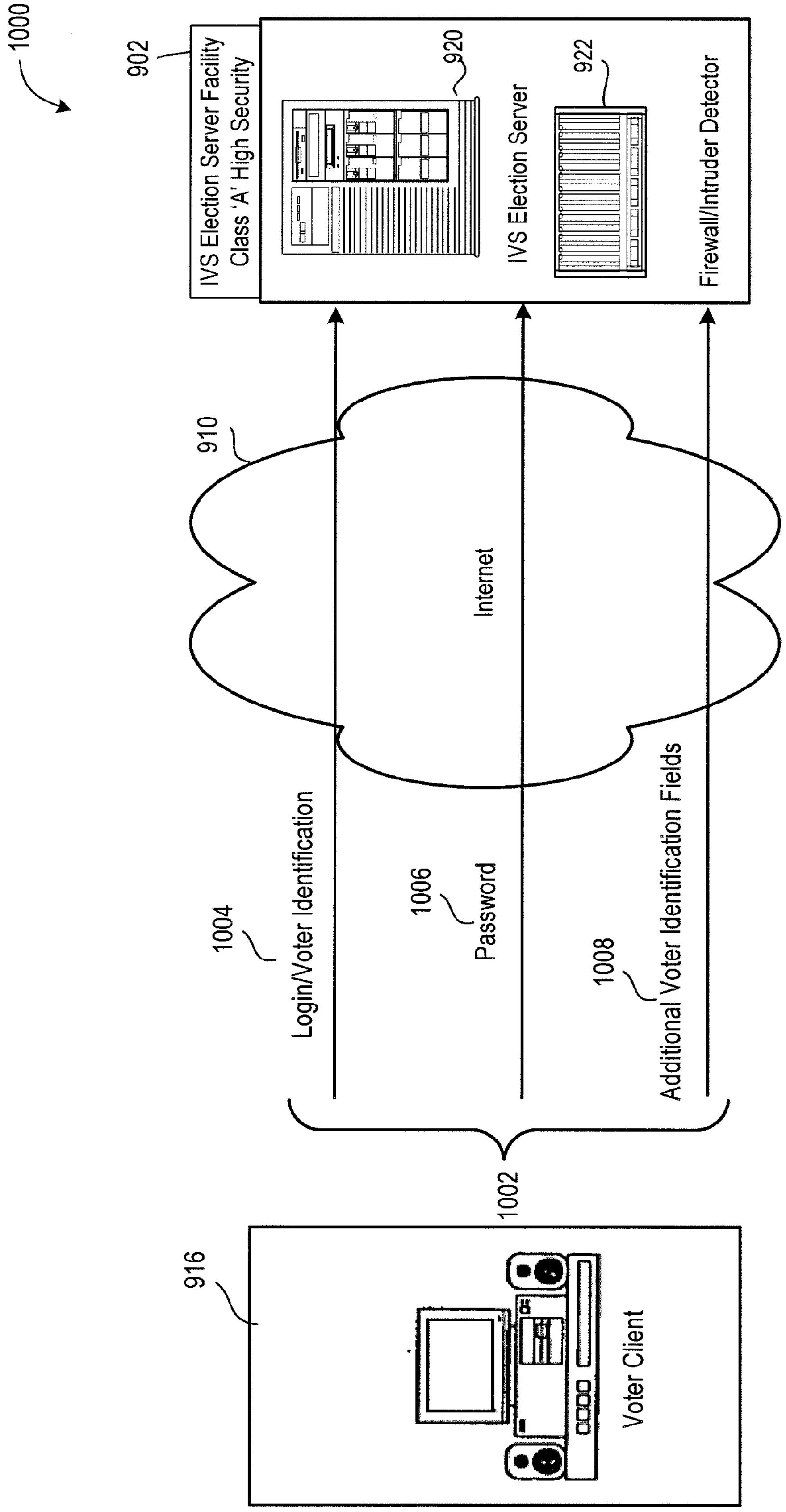
FIG. 10 depicts a multiple layer authentication procedure in use on the system shown in FIG. 9.
Figure 14:
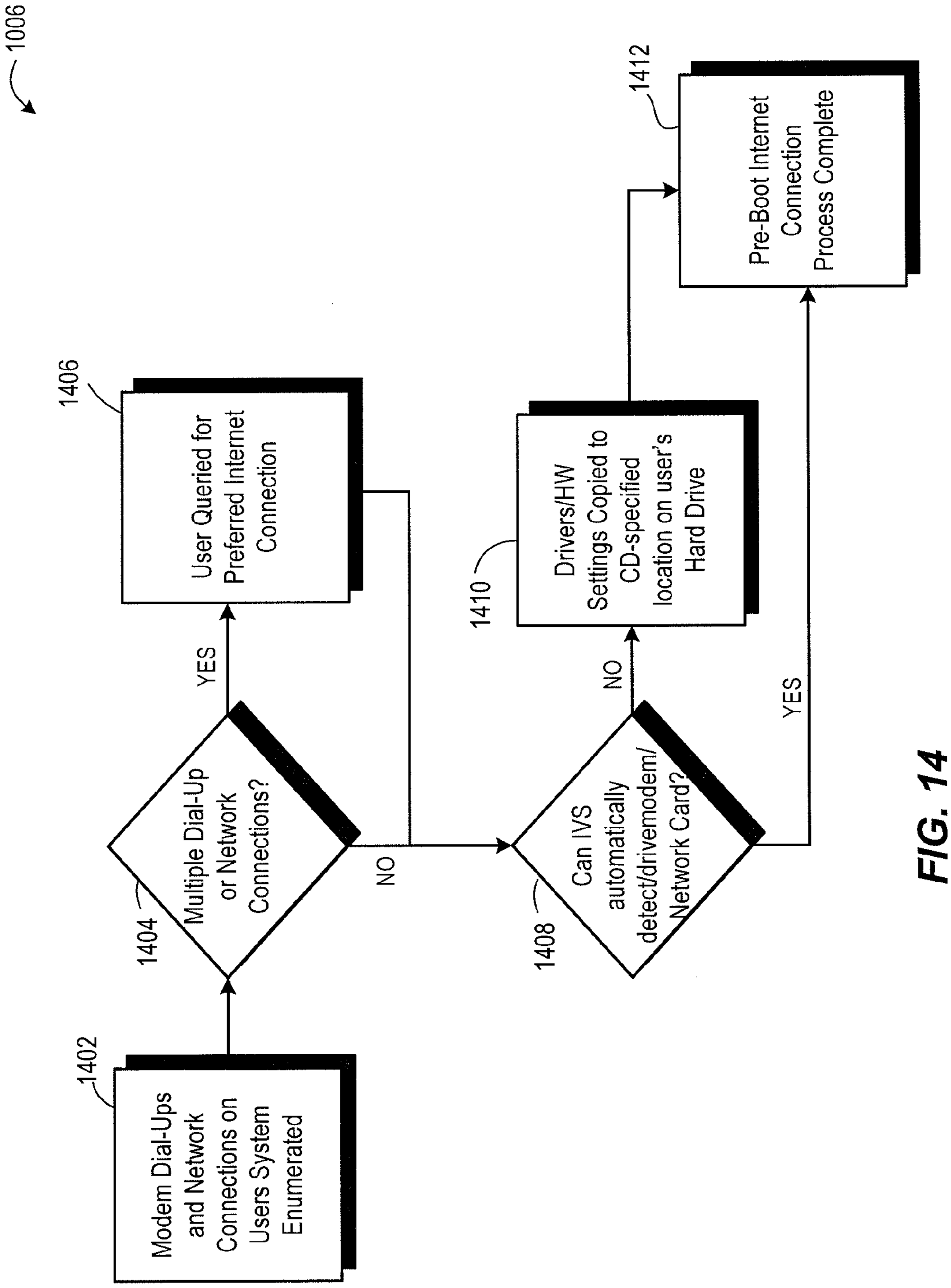
FIG. 14 provides additional detail with respect to a process step from FIG. 12.

FIG. 14 provides additional detail with respect to step 1006, which provides a preboot Internet connection as shown in FIG. 10. Information on the voter client hard drive is valuable in terms of providing connectivity to the Internet. There are at least four options as to how an Internet connection may be achieved.

The first option is that of a sponsored Internet connection. A single Internet service provider provides Internet service for a particular election. Programs on the IVS CD search for a standard modem, automatically dial to the Internet service provider, and authenticate with the service provider using authentication information that is stored on the IVS CD. Useful information in this regard includes the modem telephone phone number for server access, authentication codes, login information, password information, and server address.

The sponsored Internet connection option offers a significant improvements to denial of service attacks in which web servers, routers, or domain name servers are flooded with millions of junk requests. Control over the reliability of the election service is maintained by keeping all of the election service within a single Internet service provider. These precautions are also justified:

The Internet routers are configured as closely as practicable to convert the service into a private network for purposes of the election, which permits the Internet service provider and the election server to route traffic pursuant to election needs.

The IVS application stores the Internet server address as a numerical address, which prevents the application from having to access a Domain Name Service computer to resolve an alphanumeric uniform resource locator or URL, thereby defeating one form of denial of service attack, where implementation of this feature is as simple as launching a web browser with the proper numerical server address target.

The election server is provided with no uniform resource locator which means that there is no need to list the election web site with a domain name service provider, such as Network Solutions, since only a numerical address is used.

The election server is provided with multiple server internet addresses, e.g., ten thousand IP addresses in an election with one million voters, which prevents a hacker from opening the IVS application to read the server addresses for purposes of implementing a denial of service attack on all ten thousand addresses. The election server would refuse to service more than one hundred simultaneous processes for any particular valid election IP address. A hacker would have to pen at least 10,000 CD's (an extreme minimum) to provide an effective denial of service attack.

A second option is to load information onto a floppy, which is available to the IVS CD. This information includes the dial up configuration for an Internet server, the network configuration, and network or special modem drivers. This information is loaded into the floppy by the IVS setup program. This option is less preferred in El Torito compliant systems at present due to program errors or bugs that make it difficult to access the a:\ drive from the booted CD drive.

A third option is to inform the user that configuration information must be written down for entry into the IVS application program after boot. This information includes an ISP server address and a modem dial up number.

A fourth option is most preferred and includes the IVS setup program copying relevant configuration information and drivers into a location on the user's hard drive. This location is specified by the IVS CD. The IVS application program can access the data and drivers after executing from the bootable CD ROM. In the case of loading network drivers, this method carries a small risk that the drivers themselves are corrupted and include Trojan horse programs. This risk can be mitigated by firewall protection measures including verification that the drivers occupy the correct amount of memory for verification, substitution with equivalent drivers from a known secure source (e.g., IVS election server 902), and interactive checking procedures such as polling to produce an expected response. There is considered to be no risk from accessing the configuration data, which contains no code and is treated as simple text data from the user's hard drive.

This fourth option is implemented as shown in FIG. 14. In step 1402, the setup program enumerates all modem dial ups and network configurations on the voter client system. These include all possible Internet connections including networks and modem dial ups from the voter client system. As determined in step 1404, if more than one method of Internet access exists, the user is queried as to the preferred method in step 1406. Once the method of Internet access has been determined, the setup program attempts to detect a drivemodem or network card in step 1408. If these cannot be detected, drivers and hardware settings are copied onto the voter client hard drive to a location specified by the setup program in step 1410. If a drive modem or network card can be detected, then the preboot Internet connection process is complete in step 1412.

Figure 15:
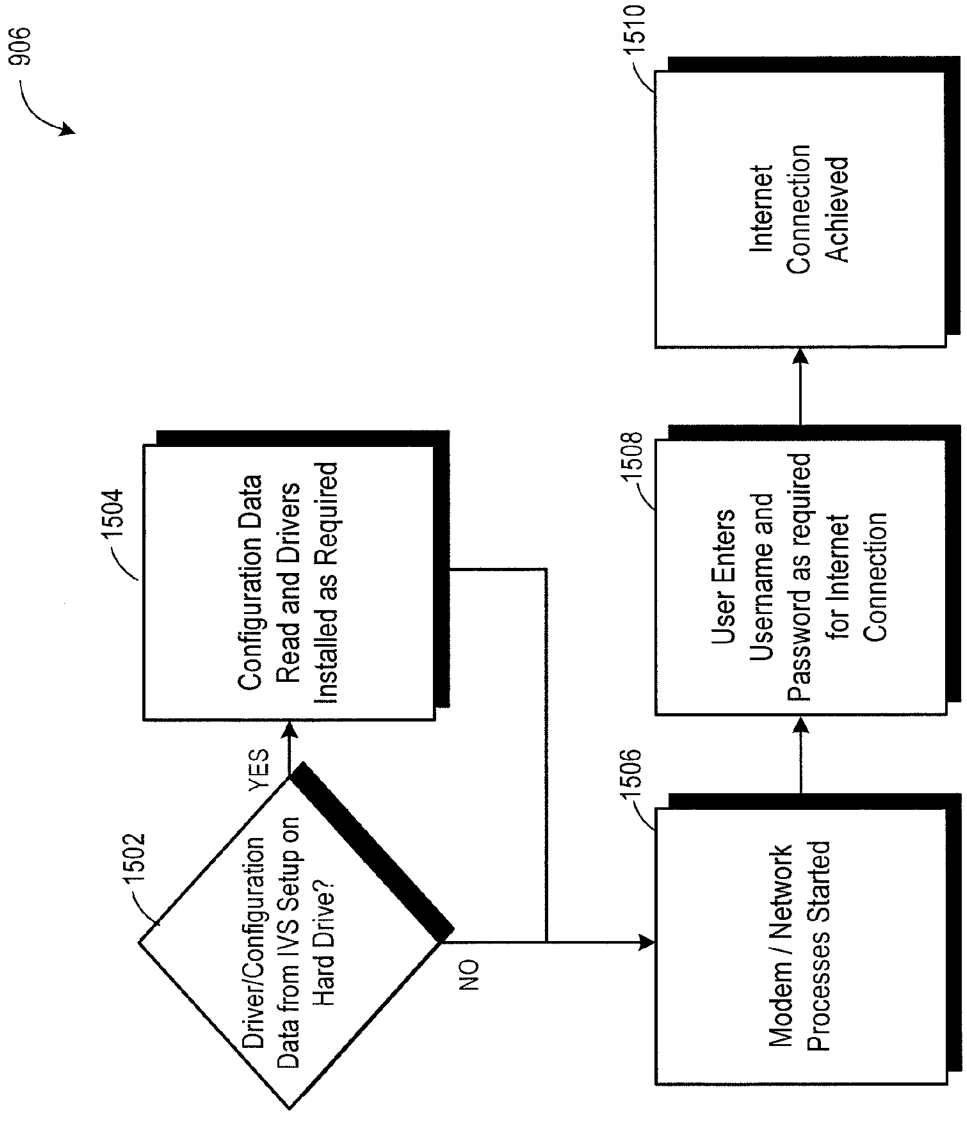
FIG. 15 provides additional detail with respect to a process step from FIG. 12.

FIG. 15 provides additional detail with respect to the post boot Internet connection step 906, as also shown in FIG. 9. Once the voter client system is rebooted after setup initialization in step 904 (see FIG. 9), the IVS application program checks the specified hard drive location for configuration data or drivers in step 1502. If the configuration data or drivers are found, in step 1504 the IVS application program reads the data and installs the drivers as required. If the data and drivers are not found, it is assumed that the default drivers and configuration data found on the CD ROM are sufficient, and modem processes including a dial up connection to the user's Internet service provider are started in step 1506. The user enters a username and password as required to complete the Internet connection in step 1508, and the Internet connection is completed by normal means in step 1510.

Booting Windows from CD-ROM

The vast majority of personal computers operate using the Windows operating system. Thus, it is preferred to use Windows related procedures to create and boot a bootable CD ROM. The following procedure works for Windows 95b up through Windows 98. A different procedure would need be developed for creating Bootable CD ROMs of Windows NT or 2000, as these OS have a very different structure.

A CD ROM burner and the respective software as well as at least 500 Mbytes of hard disk space and a few freeware programs from the Internet, as described later, to make a bootable CD ROM. Also, Windows should be installed on a computer.

The Windows registry is loaded onto a RAM disk. A RAM disk is a part of main memory pretending to be a normal hard disk, but the RAM disk is volatile in the sense that it does not retain its memory beyond a reboot. Only the registry files need be copied. Not all Windows files must be copied. Accordingly, the RAM disk space that is required for the 40 MB of a minimal Windows installation is reduced to less than 4 MB. All other Windows will not change after startup and these remain on the CD. In this manner, Windows will run on a combination of RAM disk and CD ROM. Thus, the registry has the write access that it requires without a hard disk being present.

It is helpful to create several hard disk directories including c:\w for storing the CD ROM boot image and c:\cdrom to store everything that will afterwards be put on CD. The data, which needs to go into RAM disk, is initially saved in c:\cdrom\ramdisk. The RAM disk's 'Windows directory' will be c:\cdrom\ramdisk\w. Also, the system configuration files including msdos.sys, io.sys, config.sys and autoexec.bat are stored in c:\backup. The c:\w directory should also hold dblbuff.sys, himen.sys, ifshlp.sys and setver.exe from the Windows directory, as well as attrib.exe, keyb.com, keyboard.sys, mscdex.exe, subst.exe, xcopy.exe, xcopy32.exe. For Windows 98, xcopy32.mod is also stored from c:\windows\command. The DOS driver(s) for the CD ROM drive and a RAM disk driver are also stored in a suitable directory. Ramdrive.sys, which comes with Windows, is unsuitable because it cannot be assigned a drive letter. A well-tested alternative is xmsdsk.exe, a publicly available free utility, among others, that can be downloaded from the Internet.

Before re-installing Windows, delete c:\config.sys together with c:\autoexec.bat, and then create a new autoexec.bat containing the following:

```
c:\w\subst.exe x: c:\cdrom
path c:\;c:\w
```

The system will later run from CD and the CD ROM drive that can only be assigned a drive letter which hasn't been assigned yet. The system should be installed on a drive with a letter from the back of the alphabet. This convention is important to make all registry links and paths partition-independent. Instead of setting up a number of dummy partitions, the subst DOS command assigns a drive letter to a hard disk directory of your choice. The first line in autoexec.bat makes the c:\cdrom drive accessible as drive X, and the CD ROM drive is accessed in the same manner after booting the system.

The overwriting of existing installations with the following Windows setup is avoided by renaming all win.com and system.ini files in all Windows directories on all partitions, even in the current partition. A similar renaming process applies to files called system.dat. However, these cannot be accessed until after leaving Windows and rebooting the computer to its command line. The system.dat files are made accessible by typing attrib -r -h -s and giving each file a new name. The basis for taking this precaution is that windows looks for it will look for a system.dat file—which contains the registry—on all the other partitions and will start Windows from the other partition when Windows cannot find the registry in the place it is looking for during startup. This access of system.dat files from the wrong partition may cause the wrong system.dat to be booted and might even influence other installations.

Windows is reinstalled by starting setup.exe from the hard disk directory containing the Win9x branch that was copied from the original Windows CD. Setup will complain that subst.exe is loaded. Ignore this message by pressing ESC against the program's recommendation. Use X:\W as the installation path.

The first installation reboot must be done from the Windows startup floppy that was previously made. Therefore, ignore the instruction to remove all floppy disks from the drives. When installed on a network drive—and virtual drives created with subst belong in this category—Windows does not automatically choose the right paths for autoexec.bat and config.sys. Therefore, the first reboot must be done from the startup floppy, enabling correction of these paths, and add ifshlp.sys—a missing file which supports VFAT—to the config.sys file. Use edit to load c:\config.sys from the command line and make sure it contains at least the following lines with correct path instructions:

devicehigh=c:\w\himem.sys devicehigh=c:\w\ifshlp.sys devicehigh=c:\w\dblbuff.sys devicehigh=c:\w\setver.exe Check autoexec.bat in the same way. The path must be extended to include the Windows and Windows\Command directories on our future CD. Without this information, the system cannot find win.com when booted from CD. This file initializes the GUI mode startup process. The minimal configuration looks like this:

c:\w\subst.exe x: c:\cdrom path c:\w;x:\w;x:\w\command;x:\w\system

Remove the startup floppy, restart the computer using ctrl-alt-del, and finish the installation. The Windows setup may now be adapted to include user preferences. Whatever configuration is made will be eliminated at a later time because the registry will reside in a RAM disk. Therefore, all required drivers, e.g., for sound and graphics boards, are stored on the CD, as are any other programs which are to be included on the CD. The following steps are made a bit easier by installing the TweakUI utility. In Windows 98, this utility is found in the \tools\reskit\powertoy directory on the Windows CD. A free Windows 95 version is available from the Internet.

Preparing a RAM disk for the registry again involves the DOS command subst. Add the following line as the second one to c:\autoexec.bat:

c:\w\subst.exe w: c:\cdrom\ramdisk

Windows expects to find the registry files in \msdos.sys on the startup volume. The registry files are first made accessible with attrib -s -h -r. The path instructions are adapted in the first four lines:

[Paths] WinDir=w:\w

WinBootDir=w:\w

HostWinBootDrv=w

While editing msdos.sys, add a line at the end of the last text section with

DisableLog=1

If there's already a DisableLog=0, don't add another entry for this, but just change it to 1.

The registry should be renamed to prevent the system from using a hard disk system.dat when booting from CD. The registry name is noted in c:\io.sys, which is rendered visible and edited. Then, edit it in a hex editor and search for the character sequence system.dat and change it to system.tat. This operation assures that only files named system.tat will be recognized as registry files. Any system.dat files are ignored.

This hexal patch is recommended for Windows 95, but not for Windows 98. Here, the registry name is not only wired into the io.sys file but also in the program files that are responsible for automatically checking the registry during startup. If the change is made, a registry error message occurs every time the computer boots. In addition, scanregw.exe must be prevented form being loaded, for example by deactivating it with msconfig.exe in its autostart folder.

The next Windows reboot works smoothly if the start menu folder from c:\cdrom\w is now copied to c:\cdrom\ramdisk\w.

The temporary RAM disk substitute is filled by closing Windows and starting a command prompt only. Copy system.dat, system.ini, user.dat and win.ini from c:\cdrom\w to c:\cdrom\ramdisk\w after having made them accessible with attrib. In case the io.sys patch is included, rename the system.dat file in the target directory to system.tat.

Restarting Windows will now make the program use the drive W: registry. However, the system needs write access not only to the registry but also to the Windows directory. Therefore, this directory should be put into RAM disk after booting from CD. Its position is noted in the registry at the KLM\Software\Microsoft\Windows\CurrentVersion key. Use regedit.exe to change the value systemroot to 'w:\w'.

At present, the start menu resides in the RAM disk that is simulated with subst, but it only uses up unnecessary space there, and should be moved back to the CD. Start TweakUI from the system controls folder, choose 'General' and readjust the 'Special Folders' entries for 'Programs', 'Start Menu' and 'Startup' to read 'x:\w\startmenu or the respective subdirectories. For Windows 98, also readjust the 'Desktop' entry to read 'x:\w\Desktop'. After rebooting, the w:\w\Startmenu and w:\w\Desktop folders can be deleted.

Setting up a real RAM disk requires rebooting to DOS again. The command attrib -s -h -r c:\cdrom\ramdisk*.* /s removes flags in the files which are to go into the RAM disk. Now, use edit in c:\autoexec.bat to delete or disable the line subst w: c:\cdrom\ramdisk per REM. In its place, add the following lines:

c:\w\xmsdsk 4000 w: /y copy c:\command.com w:\ set COMSPEC=w:\command.com c:\w\xcopy c:\cdrom\ramdisk*.* w:\/s

During startup, this sets up a 4000 KByte RAM disk instead of a subst drive. The copy commands fill it with a command line interpreter, which has been designated current shell via COMSPEC, and with the contents of the directory containing the registry.

If everything runs smoothly after rebooting, you can delete all files in c:\cdrom\ramdisk\w except system.ini, user.dat, win.ini, control.ini and system.tat or system.dat respectively.

An image of a bootable startup disk is required to create a bootable CD. Therefore, create a normal startup disk using format a:/s or sys a:. Copy the patched io.sys and msdos.sys files as well as the config.sys and autoexec.bat you just made from c:\, replacing existing files. In addition, put the entire c:\w directory onto the disk.

Now, a:\config.sys must be amended to include the right paths and any CD ROM driver(s). The result should look like this:

```
devicehigh=a:\w\himem.sys
devicehigh=a:\w\ifshlp.sys
devicehigh=a:\w\dblbuff.sys
devicehigh=a:\w\setver.exe
device=a:\w\aspi8dos.sys
device=a:\w\aspicd.sys /D:CD001
```

Again, paths must also be changed in a:\autoexec.bat. Additionally, the subst command must be replaced with mscdex.exe. The finished file should read like this:

```
a:\w\mscdex.exe /D:CD001 /L:X /M:50
a:\w\xmsdsk 4000 w: /y
copy a:\command.com w:\
set COMSPEC=w:\command.com
a:\w\xcopy x:\ramdisk\*.* w:\/S
path w:\;x:\w;x:\w\command; x:\w\system
x:
```

Make sure the mscdex.exe data buffer isn't too small. With the usual /M:12 and a fast drive, Windows might get stuck during startup when the drive doesn't provide the data fast enough. The parameter /L:X states that the CD ROM drive is to be given the drive letter X:.

Make sure attrib -s -h c:\cdrom*.* /s are used to remove unwanted flags from the directory contents to be copied before burning your CD. The CD is to have a Joliet file system and contain all of c:\cdrom in its root directory.

The following Internet addresses are useful in obtaining software for the purposes described above:

Free Software For DOS,
http://www.geocities.com/SiliconValley/Lakes/1401/softlib1.htm Windows 95 Power Toys Set,
http://www.microsoft.com/windows95/downloads/contents/wutoys/w95pwrtoysse
t/

WinImage,
http://www.winimage.com/

Although the foregoing discussion emphasizes a Windows programming instance, those skilled in the art will understand that identical results may be obtained from a variety of other operating systems, such as Linux or OS/2.

Figure 16:
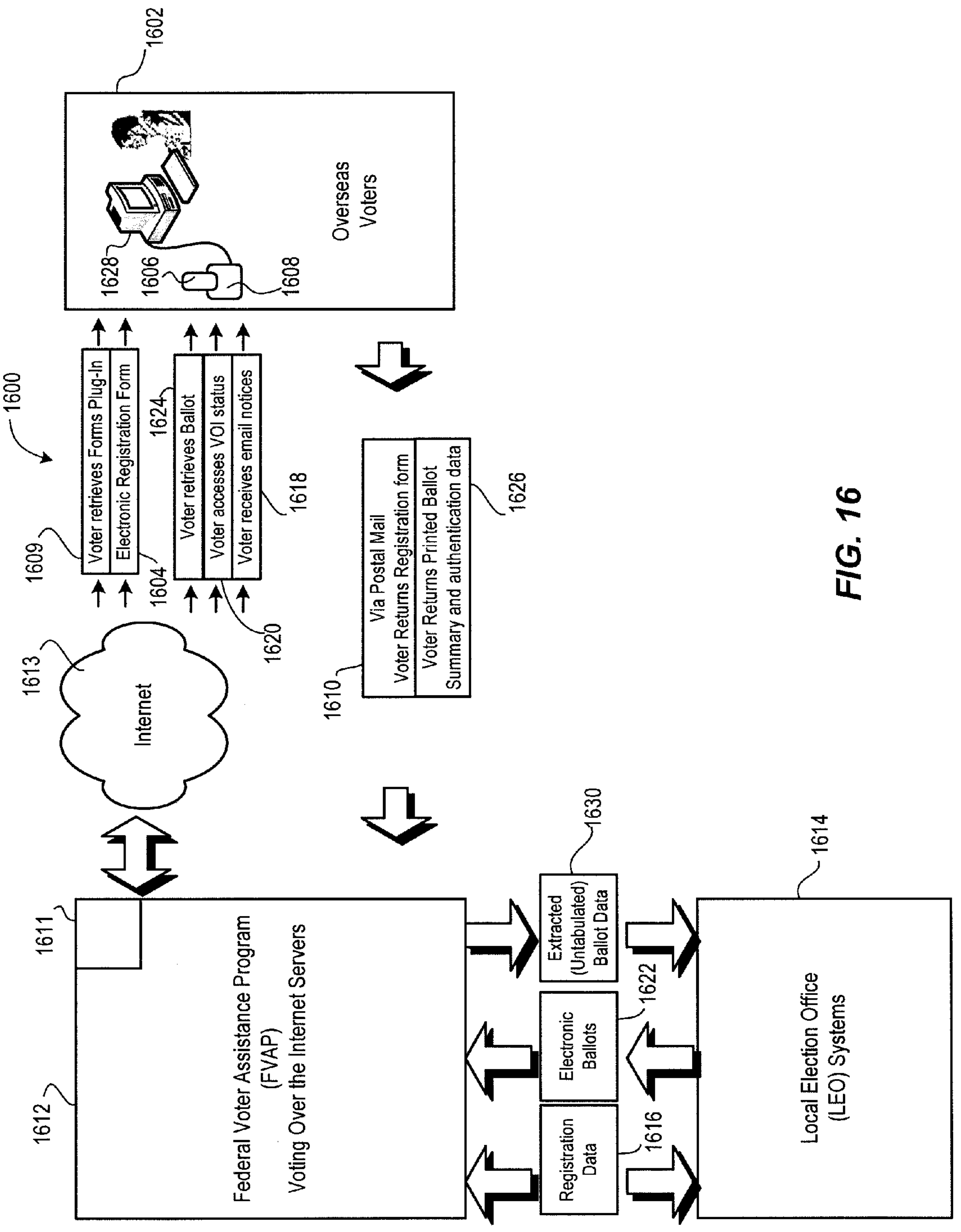
FIG. 16 provides additional detail with respect to a process step from FIG. 12.

FIG. 16 shows how the foregoing principles can, by way of example, be combined to provide a hybrid system 1600 that meets the objectives of FVPA in providing access to overseas voters system 1600 allows the overseas voter 1602 by processes 1604 to download an absentee ballot request form 1606 or receive it as an attachment to an e-mail in a machine readable format, then print it out on a local printer 1608. The voter 1602 may manually fill in the required information and mail the request form 1606 to the FVAP by postal mail in step 1610. To simplify the voter request, a central web site 1612 is established listing the participating LEOs by State. The voter 1602 is easily notified through his or her overseas sponsor about the existence of the web site 1610. The request form 1606 may, for example, contain the voter's ink signature, a ballot password and other information used to authenticate the voter. Since the voter 1602 has demonstrated access to the Internet 1613, it is highly likely that they also have an e-mail address that is also included on the absentee ballot request form. The subsequent use of electronic mail communication with the voter 1602 during the election cycle once actual ballots are available significantly expedites the voting process because overseas mail delays are eliminated in submitting the ballots to the voter 1602.

Upon receipt of the absentee ballot request form 1606, the LEO 1614 authenticates the voter 1602 using whatever voter registration method employed locally or at the State level. Ideally, the voter registration information is stored electronically at the LEO in a database format and allows the voter 1602 to be identified as an absentee voter by registration information exchange processes 1616. Tracking, updating and managing the voter throughout the election cycle can be done by the voter registration processes 1616 or a separate web-based package access by the LEO 1614 from a local terminal. This separate web-based, voter management program may reside on a secure server 1611 within the FVAP 1612 permitting and LEO 1614 to subscribe to UOCAVA web services. After the request 1610 is processed by the FVAP 1612 and the LEO 1614, the voter 1602 may receive confirmation by email processes 1618 that the request 1606 for an absentee ballot has been received, and the request/voting status of a voter may also be available online for the voter to review by process 1620. This completes the first cycle of the voting process. The second cycle is triggered by the conventional certification of the ballot 1622 by LEO 1614 and related election authorities.

Once the ballot 1622 has been certified, the electronic form of the ballot 1622 is made available to the voter 1602 by email process 1624. The voter 1602 may also be notified via email processes 1618 when the specific ballot is available for voting. The voter may receive the ballot 1622 through one of two possible methods. The first method sends ballot 1622 to the voter 1602 as an attachment to a email which the voter prints, marks and mails by regular postal mail in step 1626. The electronic form of ballot 1622 can be password protected, employ private key encryption (PKI) or other methods to prevent unauthorized access. The second method would has the UOCAVA web server 1611 e-mail the voter 1602 a unique URL that the voter 1602 accesses through an Internet browser, e.g., using secure messaging software to set up an SSL session with each voter 1602 through the unique URL. Access to the contents of the URL can be password protected to prevent un-authorized access. All communications and transactions between a voter 1602 and LEO 1614 are audited for verification of communication traffic.

Protection of the registration form 1606 and the ballot 1622 is not a critical factor, nor are any computational requirements necessarily placed on the voter's workstation. All electronic forms can be delivered printer-ready so the only function performed is to send the document to the printer. The voter 1602 can validate that the form (e.g., ballot 1622) is correct before marking his or her choices. The ballot 1622 can also contain other machine-readable authentication markings that include encrypted 2-dimensional barcodes that can contain over one kilobyte of data.

At the appropriate time, voter 1620 accesses the ballot 1622 online, enters his or her selections electronically, enters the appropriate authentication data, and prints the ballot 1606 with the help of a forms processor that is a web browser plug-in 1609. The printed form of ballot 1622 may include the voter's actual selections only, not the entire ballot face. The printed ballot 1622 may also include a 2-D bar code which encodes all the voters selections and authentication data. This printed form of ballot 1622 is then checked for correctness by the voter 1602, manually signed for authentication as a regular absentee ballot is, and mailed to the FVAP 1612 or to the LEO 1614. At the point of receipt, the ballot data 1630 is extracted automatically and seamlessly from the printed form of ballot 1622, but the tabulation of ballots is not done until required by the LEO 1614. Throughout this process, the voter 1602 may access the Internet 1613 to check the registration status and whether the ballot 1622 has been received.

There are several advantages to this system 1600. The problem of viruses and Trojan horses is substantially eliminated. The voter 1602 can actually check that his or her intentions were properly recorded by reviewing the printed output, which shows a summary of the voter's selections. By the introduction of machine-readable elements in this output, the voter's selections can be quickly and accurately extracted from the returned ballot 1622. The returned paper ballot from step 1626 may be used as part of the audit trial. Authentication of the voter 1602 is made simpler by using machine-readable voter name, address and other authentication elements derived from registration processes 1616. The voter's ink signature, which may be collected and processed digitally, provides the same authentication level as any absentee ballot. The system 1600 cleanly and easily integrates with current ballot definition and tabulation systems.

An overseas voter 1602 is able to register and receive ballot 1622 on any Internet-connected computer 1628. The problem of a registration form 1606 or a paper ballot 1622 being sent to the wrong address, due to geographical movement of the voter 1602, is eliminated. The voter 1602 is able to review the status of his or her registration 1606 and receipt of the completed ballot 1622. The voter 1602 is, accordingly, comfortable that his or her vote is recorded accurately and has not been corrupted, as the voter 1602 can physically review ballot selections in paper before mailing. An important advantage is that system 1600 does not necessarily require digital certificates, although, these can be added to the data enclosed on the printed form of ballot 1622 for further authentication.

Figure 17:
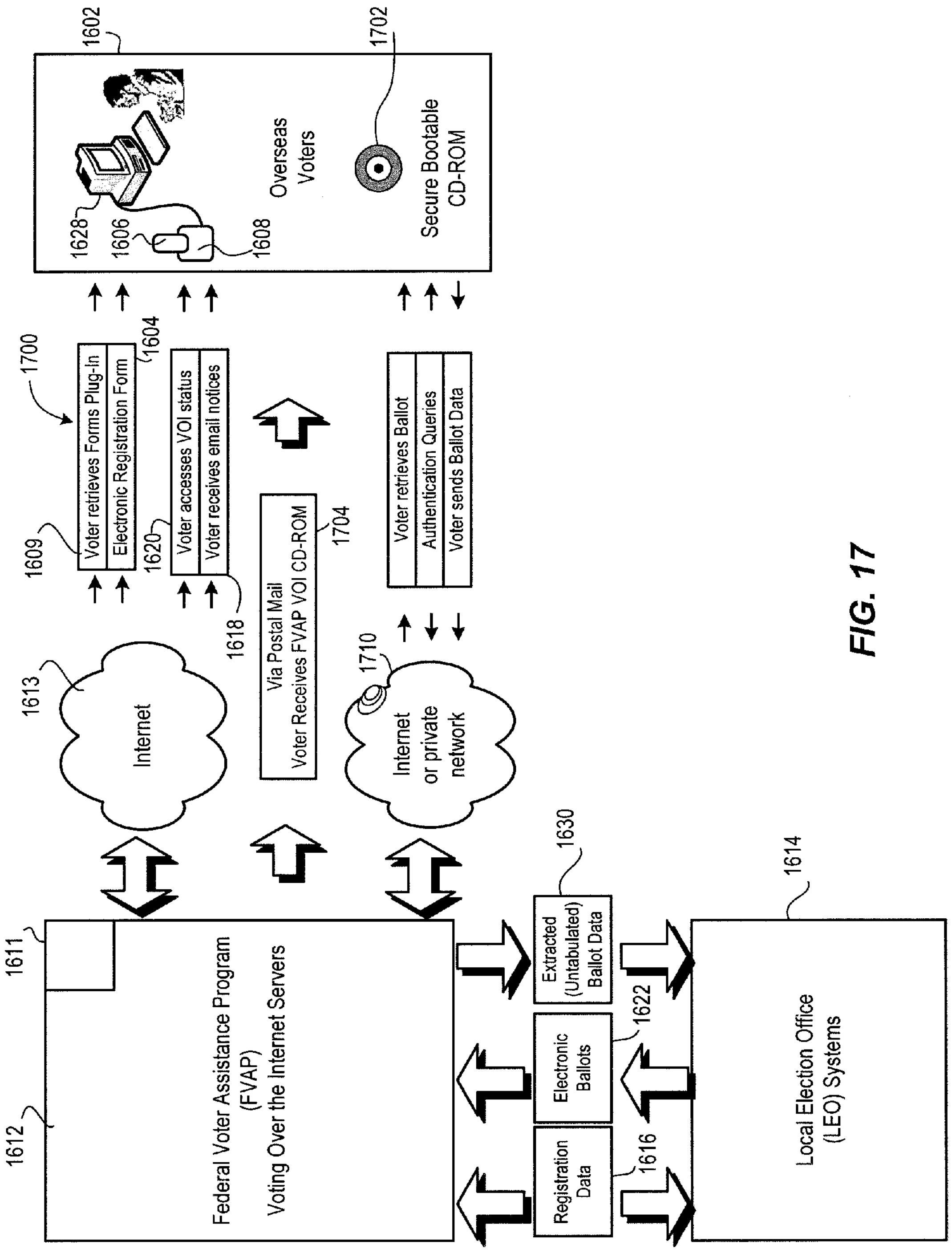
FIG. 17 is a diagram that demonstrates modifications to the system of FIG. 16.

FIG. 17 demonstrates modifications to system 1600 that permits secure voting over the Internet 1613. In FIG. 17, Like number of identical system components has been retained with respect to FIG. 16. System 1700 provides additional security that allows the voter 1602 to make voting selections using PC 1628 and electronically cast the completed ballot 1622 in electronic form through use of the Internet 1613. Thus, there is no reliance upon physical and potentially foreign mail systems to transport the completed ballot 1622 back to LEO 1614 or FVAP 1612 in a timely manner.

As previously noted, any program of any kind running on a general purpose computer may have hidden on it's hard drive or within in a machine readable format it's operating system malicious code and could, for example, intercept user's keystrokes and alter them, or put up screens that intercept any user information and use it maliciously.

In system 1700, an interface program to the FVAP 1612 system is contained on an unalterable Bootable CD-ROM 1702, as is described above. When programming on the CD-ROM 1702 is executed, computer 1628 operates solely accessing the CD-ROM 1702 such that the hard disk is not opened or touched in any way ant the normal operating system is not executed. Viruses may exist on the hard drive, but they will not be executed because the hard drive that they exist on will not be accessed. Trojan horses, which are malicious code embedded in trusted programs or operating system elements, will not be a risk as these programs will never run. The Bootable CD-ROM 1702 is in an unwriteable format that cannot be altered or virus-infected after receipt by the overseas voter. FVAP mails the CD-ROM 1702 to voter 1602, for example, in step 1704 following interactive online authentication queries 1706 that may optionally eliminate step 1610 of mailing the registration form to FVAP 1611. The authentication queries 1706 may be repeated to validate voter 1602, as confirmed by authentication information on CD-ROM 1702, prior to permitting voter 1602 to vote in an election.

System 1700 differs from system 1600 primarily in that voter 1602 uses computer 1602 to answer the authentication queries 1706 prior to voting after receiving the ballot 1622 in step 1624. The voter 1602 also uses computer 1628 to cast votes using ballot logic that may reside on CD-ROM 1702 or may be attached to the electronic form of ballot 1622. Voter 1708 is then able to cast the completed ballot 1622 electronically in step 1708.

The use of a Bootable CD-ROM 1702 also allows some control of the paths the ballot data takes through the Internet 1613. The program instructions may direct the data to specific Internet service providers; avoid the Internet Domain Naming System (DNS) by directing the data to specific Internet addresses or even direct the data to an optional completely private data network 1710, such as a private dial-up network service that replaces the Internet 1613. These various options reduce the risks of potential denial of service attacks and other realistic attacks, such as DNS spoofing.

From the point of view of LEO 1614, system 1700 is practically identical to system 1600 that is described in context of FIG. 16. The registration, ballot definition and tabulation functions at the LEO 1614 proceed identically between the respective systems. In fact, both systems 1600 and 1700 can be operated by the FVAP simultaneously. Various aspects of systems 1600 and 1700 may be switched and combined, such as using ballot logic on the CD-ROM 1702 to assist voter 1602 in completing ballot 1622 by electronic means, followed by printing and mailing of the printed form of ballot 1622 according to step 1626, as shown in FIG. 16.

Figure 18:
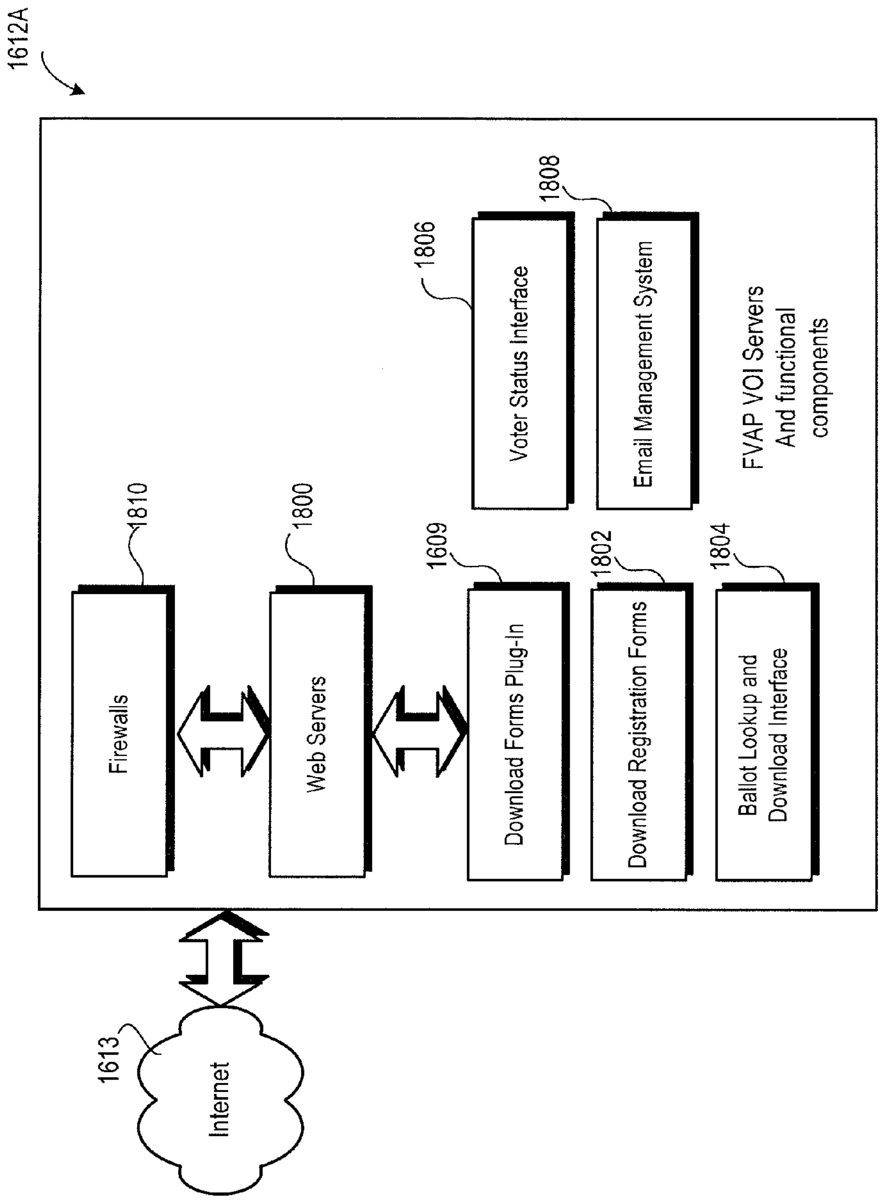
FIG. 18 is a diagram showing additional detail with respect to a process step from FIG 12.

FIG. 18 shows functional components of the FVAP 1612A, which is described in reference to the discussion of FIG. 16 for all reference numbers beginning in 16_. The voter 1602 (see FIGS. 16 and 17) has access to FVAP 1612A through web server 1800 to download the registration forms plug-in 1609. The forms plug-in 1609 operates in any standard web browser, and allows the voter 1602 to display the registration or ballot forms. The voter 1602 enters data through the computer 1628 into the appropriate spaces within a registration form that is appropriately selected for the voter 1602 from a database of downloadable forms 1802. The selected form may be an object including logic or program instructions such that, upon printing the form to any standard printer, e.g., printer 1608 shown in FIG. 16, the output is not the form as displayed to the user visually on computer 1628, but a summary of the data that fits into a single page regardless of the ballot size. The voter's authentication data and a signature line for the user to fill in are also printed. In addition, a 2D bar code can be printed on the single sheet that encodes all the data within the printed form, making the page machine-readable regardless of printer type. Once the voter 1602 has installed the Forms Plug-In 1609, the voter 1602 can download and display the registration form. Voter 1602 can then fill out the form, sign as required, and mail the form to FVAP 1612A or LEO 1614, as instructed.

Once the voter 1602 has installed the Forms Plug-In 1609, and the ballot 1622 is ready for pickup, the voter 1622 can look up the particular ballot for the voter's jurisdiction and precinct, and download the ballot 1622 using the ballot lookup and download interface 1804. The interface 1804 can be authenticated, e.g., by password-protection, and all access is through a secure SSL session. The voter 1622 can then open the ballot 1622, provide the authentication data as required and make the voter's selections. The voter 1622 then prints the summary to the ballot, signs where required, and mails the ballot to the FVAP or jurisdiction, as instructed, or transmits the completed ballot by electronic means as shown in FIG. 17.

Using the password or authentication information that is supplied on the registration form 1606, a voter may enter an interface 1806 to see the voter's registration status, registration data, and voting status. In this way a voter may be assured that he or she is properly registered, and that the voter's ballot has been properly received.

The system 1600 can send status emails to the voter through use of an email management system 1808, provided the voter's email address as received in the registration form. The voter 1602 can be notified about registration and ballots that are received by FVAP 1612A, or informed about problems with either. The voter 1602 can also be informed about ballots being ready for download, or instructions specific to a certain jurisdictions election.

A conventional firewall 1810 provides appropriate security protection against viruses, denial of service attacks, and other such problems as may arise.

Figure 19:
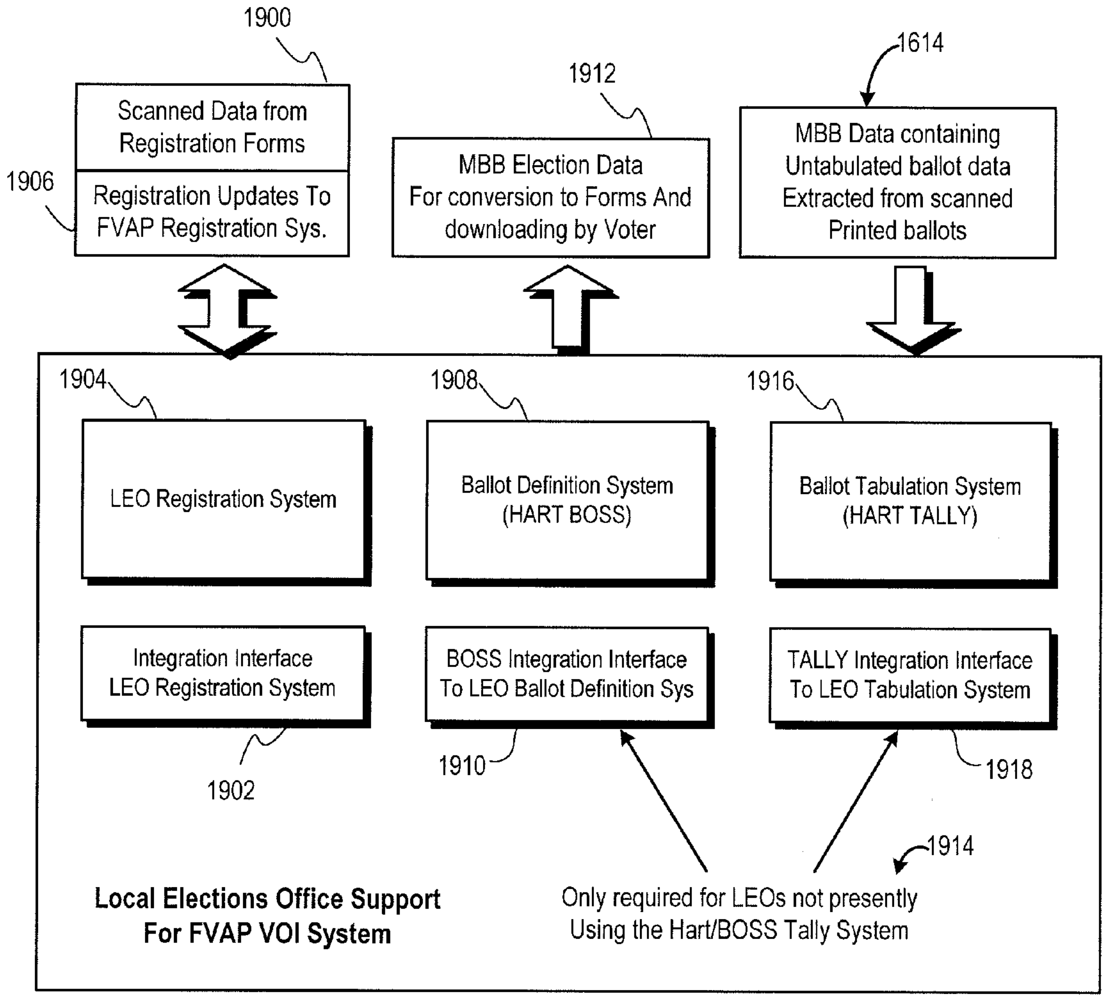
FIG. 19 provides additional information about functional components of a process from FIG. l6.

FIG. 19 provides additional information about functional components of LEO 1614, which has the overall responsibility of updating registration records according to official standards, of creating or defining the ballots used in an election, and of tabulating the results of overseas ballots cast in their jurisdictions. The data 1900 extracted from registration forms arrives at the LEO Integration Interface 1902 to expedite the creation of registration records from scanned registration forms. This data is stored and managed by the LEO integration system 1904. Conversely, if the scanning is done at the LEO 1614, then the same data 1906 is sent up to the FVAP 1612A for integration into the FVAP 1612A registration records.

LEO 1614 may use commercially available ballot definition software, such as the Hart Ballot Origination Software System (BOSS™) which is available from Hart InterCivic of Austin, Tex., ballot definition may be completed when the LEO 1614 codes its ballots. The ballot definitions are stored and managed by the ballot definition system 1908. A ballot integration interface 1910 may be used as a protocol converter to accept input from other commercially available ballot definition packages. The Mobile Ballot Box (MBB™), which is commercially available for hart InterCivic of Austin, Tex., one example of a commercially available device providing a standard format for transfer of both ballot definition data and cast vote data. When using system components provided by Hart InterCivic, The BOSS™ system writes out this MBB™ data 1912, which is transferred to the FVAP 1612A (see FIG. 16). At the FVAP 1612A, the ballot data 1912 is converted to downloadable ballot forms 1622, and information in the MBB™ on which ballot styles map to which precincts or jurisdictions is used to update the Ballot database at the FVAP 1612A. If the LEO 1614 is not using the BOSS™ system, then the BOSS Integration Interface 1910 transfers election data from the alternative ballot definition system 1914 to the BOSS™ system 1904.

If the jurisdiction is presently using the Hart Tally™ tabulation system 1916 to tally election results, then the MBB™ containing the extracted data from the scanned ballots is simply added to the Tally™ system that is used for that election. If the LEO 1612A is not using the Tally™ system to tally results, then the MBB™ will be tabulated within the Tally™ system 1916 after cast vote data is transferred to the LEO tabulation system 1916 via the Tally Integration Interface 1918, which functions as a protocol converter.

In operation of systems 1600 and 1700, the voter 1602 first visits the FVAP 1612A website to downloads and install the special form plug-in 1609, which allows the voter 1602 to display and interact with the FVAP Registration and Ballot forms. Once this is completed, the voter 1602 may download the online registration form, fill it out, and print it out via any standard printer 1608. The printout, which derives from the form plug-in 1609, optionally does not reflect the displayed screen at computer 1628, but may be the summary of all required registration data. This required data may include data specific to the needs of the FVAP 1612A program, such as email address and authentication data, e.g., mother's maiden name, preferred password, availability of digital certificate, etc. The printed registration form may include a signature line. The printed registration form may include a 2-D bar code that encodes all the data entered into the form. This will allow easy extraction of the data from the printed page regardless of printer type.

The voter 1602 may receive email notices 1618, such as confirmation of his or her registration, and instructions on how to access or alter his or her voter registration data. The voter 1602 may receive via email instructions about upcoming elections or be alerted to a ballot that is ready for pickup. The notices 1618 may provide instructions on how to access or alter the voter registration data. The voter 1602 may also receive email instructions about upcoming elections or be alerted to a ballot ready for pickup. Upon receipt by the FVAP 1612A or LEO 1614, the voter registration printed form is scanned by the Hart Ballot Now system, and all the relevant information is extracted. If required, the signature can be digitally scanned and placed in the registration records for later comparison.

Figure 20:
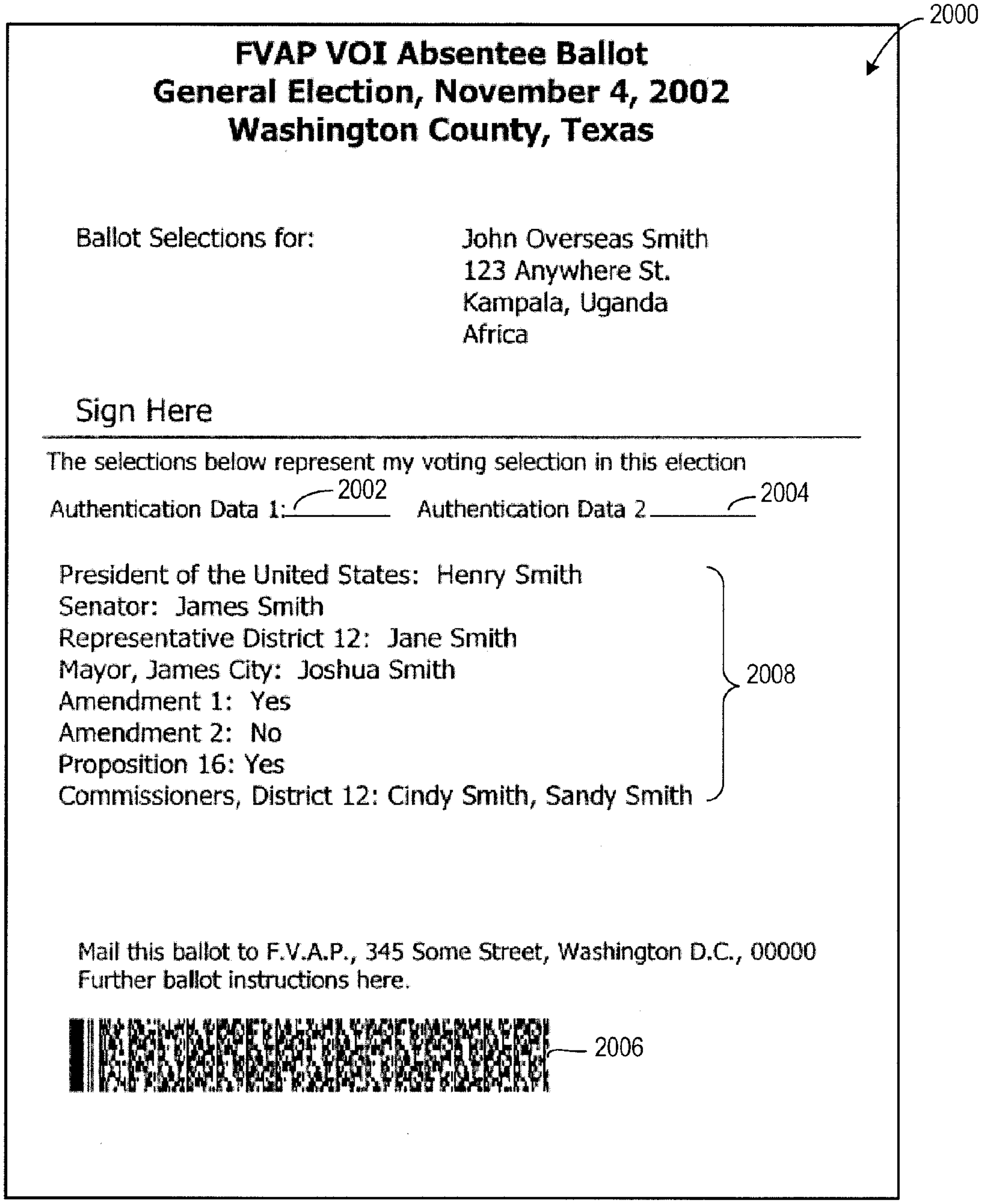
FIG. 20 shows a simple representation of what the printout of a completed ballot print out might look.

The voter 1602 accesses the FVAP 1612A to view the ballot 1622 via the Internet 1613. Access to the ballot 1622 may be restricted, if required, by password or other authentication means confirmed via the registration process. Once accessed, the voter 1622 finds a displayed ballot 1622 that is correct for the voter's jurisdiction. The ballot 1622 may be printed on printer 1608 and completed manually, or the ballot 1622 may be completed by electronic means including ballot control logic using computer 1628 with subsequent printing of the completed ballot 1622. FIG. 20 shows a simple representation of what the printout of a completed ballot print out 2000 might look like when the ballot indicia summarizes the cast vote record.

After the ballot 2000 is printed, the voter 1612A mails it as instructed to the FVAP 1612A or the LEO 1614. The voter 1612A may receive email confirmation of receipt of the ballot 2000, and the status of the ballot receipt is available online at the FVAP 1612A.

Some jurisdictions prefer a security envelope with a signature line and authentication data on it. This allows the LEO 1614 or the FVAP 1612A to authenticate that a ballot 2000 is from a validly registered voter prior to viewing the contents of the ballot 1622. Accordingly, the forms plug-in 1609 may print out two pages, with the authentication information 2002, 2004 resident on the second page. Instructions may be given to the voter 1602 to fold the ballot 2000 inside the sheet with the authentication information, providing a similar function to the security envelope. Upon receipt at the FVAP 1612A or LEO 1614, a 2-D bar code 2006 may be scanned to capture the cast vote record, which is summarized in fields 2008.

Figure 21:
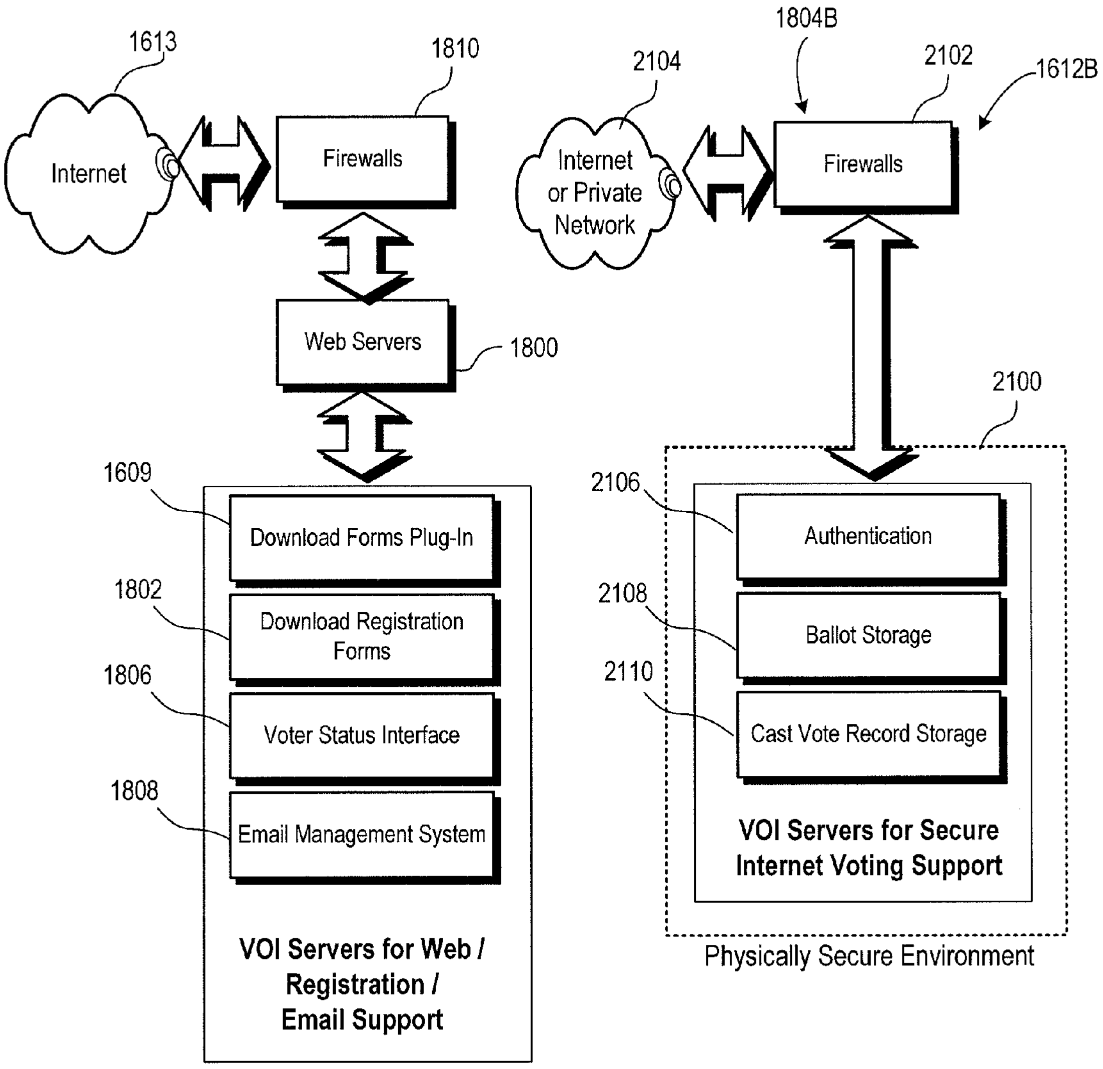
FIG. 21 is a diagram that outlines the functional components of a process of FIG. 17.

FIG. 21 outlines the functional components housed by the FVAP 1622B, which applies to system 1700. FVAP 1622B differs from FVAP 1622A in that the ballot lookup and download interface 1804B comprises a second highly secure server 2100 with separate firewall protection 2102 and Internet access 2104.

Within the server 2100, authentication module 2106 is used to authenticate a voter with use of the bootable CD-Rom 1702. A ballot storage module 2108 contains all ballot styles that are required for an election, along with jurisdiction-specific ballot logic and display requirements. Overseas voters voting on system 1700 will retrieve their specific ballots from this module. Cast votes received from voter 1602 are stored in an encrypted fashion in the cast vote record storage module 2110, and the information is also written directly to a read-only medium for security and redundancy.

Therefore, the invention in its broader aspects is not limited to the specific details, representative devices and methods, and illustrative examples shown and described. Accordingly, departures may be made from such details without departing from the spirit or scope of the general inventive concept as defined by the appended claims and their equivalents.

What is claimed is:

1. A method of voting through use of a distributed network, the method comprising the steps of:

creating a ballot viewer object that contains executable program instructions for authenticating a voter and electronic ballot information;

transporting the ballot viewer object from an election system including a server to a personal computer at a location remote from the server system through use of a network;

authenticating the voter through use of the executable program instructions for authenticating a voter by analysis of authentication information provided by the voter at the personal computer;

permitting the voter to create a cast vote record by interaction with the electronic ballot information; and communicating the cast vote record to the server system for use in computation of election results;

wherein the step of permitting the voter to create a cast vote record comprises printing the electronic ballot information to provide a printed form, and the step of communicating the cast vote record comprises mailing the printed from to an election authority for input to the election system; the step of authenticating the voter being performed in a self-sustaining mode that does not require interaction between the personal computer and the server after the step of transporting the ballot viewer object is complete.

2. The method according to claim 1, wherein the step of permitting the voter to create a cast vote record comprises manually interacting with the printed form to provide a cast vote record that can be read by an optical machine.

3. The method according to claim 1, wherein the step of permitting the voter to create a cast vote record comprises interacting with the electronic ballot information by electronic means to create the cast vote record prior to the step of printing to provide a cast vote record that can be read by an optical machine.

4. The method according to claim 3, wherein the electronic means further comprises program instructions on a bootable CD-ROM and the step of interacting comprises booting a computer through use of the bootable CD-ROM.

5. The method according to claim 1, wherein the step of permitting the voter to create a cast vote record comprises interacting with the electronic ballot information by electronic means to create the cast vote record and the step of communicating the cast vote record.

6. The method according to claim 5, wherein the electronic means further comprises program instructions on a bootable CD-ROM and the step of interacting comprises booting a computer through use of the bootable CD-ROM.

7. The method according to claim 1, wherein the server system comprises a linked system between a first server authorized under federal authority for the collection of election results and a local election office (LEO) server.

8. The method according to claim 7, wherein the step of authenticating comprises transmitting authentication information between the first server and the LEO server.

9. The method according to claim 8, wherein the server system further comprises a dedicated voting system.

10. The method according to claim 1, wherein the step of transporting includes using the Internet as the network.

11. A distributed network voting system, comprising:

an electronic ballot creation agent;

a server system;

means for transporting electronic ballot information created by the electronic ballot creation engine from a server system to a personal computer at a location remote from the server system through use of a network;

means for authenticating the voter through analysis of authentication information provided by the voter at the personal computer;

means for permitting the voter to create a cast vote record by interaction with the electronic ballot information at the personal computer; and means for communicating the cast vote record to the server system for use in computation of election results, wherein the means for permitting the voter to create a cast vote record comprises means for printing the electronic ballot information to provide a printed form, wherein the means for authenticating the voter exists in a self-sustaining mode that does not require interaction between the personal computer and the server after the step of transporting the ballot viewer object is complete.

12. The system of claim 11, wherein the means for permitting the voter to create a cast vote record comprises means for providing a cast vote record that can be read by an optical machine.

13. The system of claim 12, wherein the means for providing comprises program instructions on a bootable CD-ROM.

14. The system of claim 11, wherein the means for permitting the voter to create a cast vote record comprises means for electronically interacting with the electronic ballot information to create the cast vote record.

15. The system of claim 11, wherein the server system comprises a linked system between a first server authorized under federal authority for the collection of election results and a local election office (LEO) server.

16. The system of claim 15, wherein the means for authenticating comprises means for transmitting authentication information between the first server and the LEO server.

17. The system of claim 16, wherein the server system further comprises a dedicated voting system.

* * * * *